(12) United States Patent
Kneitz et al.

(10) Patent No.: US 10,407,045 B2
(45) Date of Patent: Sep. 10, 2019

(54) METHOD FOR CONTROLLING A WHEEL ROTATIONAL SPEED OF AT LEAST ONE WHEEL OF A DRIVABLE AXLE OF A TWO-TRACK VEHICLE HAVING TWO DRIVABLE AXLES, AND TWO-TRACK VEHICLE HAVING AT LEAST TWO DRIVABLE AXLES

(71) Applicant: AVL COMMERCIAL DRIVELINE & TRACTOR ENGINEERING GMBH, Steyr (AT)

(72) Inventors: Udo Kneitz, Steyr (AT); Gerhard Stempfer, Garsten (AT); Bernhard Wittmann, Noechling (AT)

(73) Assignee: AVL COMMERCIAL DRIVELINE & TRACTOR ENGINEERING GMBH, Steyr (AT)

( * ) Notice: Subject to any disclaimer, the term of this patent is extended or adjusted under 35 U.S.C. 154(b) by 47 days.

(21) Appl. No.: 15/574,669

(22) PCT Filed: May 20, 2016

(86) PCT No.: PCT/EP2016/061428
§ 371 (c)(1),
(2) Date: Feb. 15, 2018

(87) PCT Pub. No.: WO2016/185019
PCT Pub. Date: Nov. 24, 2016

(65) Prior Publication Data
US 2018/0244257 A1 Aug. 30, 2018

(30) Foreign Application Priority Data
May 20, 2015 (DE) .......................... 10 2015 209 244

(51) Int. Cl.
*B60W 10/08* (2006.01)
*B60K 6/448* (2007.10)
(Continued)

(52) U.S. Cl.
CPC ............. *B60W 10/08* (2013.01); *B60K 6/448* (2013.01); *B60K 6/46* (2013.01); *B60K 6/52* (2013.01);
(Continued)

(58) Field of Classification Search
CPC ... B60W 10/08; B60W 2520/28; B60K 6/448; B60K 6/46; B60K 2007/0038; Y02T 10/6286; Y10S 903/93
(Continued)

(56) References Cited

U.S. PATENT DOCUMENTS 5,327,346 A    7/1994   Goodell
7,540,825 B2 * 6/2009   Hofer ..................... B60K 17/10
                                                  180/307
(Continued)

FOREIGN PATENT DOCUMENTS

DE    102004016242    10/2005
DE      60315227      4/2008
(Continued)

OTHER PUBLICATIONS

Search Report for German Patent Application No. 102015209244.5, dated Feb. 29, 2016, 12 pages.
(Continued)

*Primary Examiner* — Issac G Smith
(74) *Attorney, Agent, or Firm* — Sheridan Ross P.C.

(57) ABSTRACT

The invention relates to a method for controlling a wheel speed of a wheel of a drivable axle of a two-track vehicle with two drivable axles as well as to a corresponding vehicle, with the vehicle having a first drive motor for
(Continued)

driving the first axle, a second drive motor for driving the second axle, a device for detecting driving state variables, and a control device. The method comprises the steps: Detecting an actual speed of the first axle, determining a target speed for the second axle as a function of the actual speed of the first axle, and controlling the second drive motor such that the determined target speed is achieved on the second axle. In order to determine the target speed, a synchronous target speed at which the same wheel circumferential speed is achieved on at least one wheel of the second axle as on the wheels of the first axle is determined as a function of the actual speed of the first axle. Subsequently, the target speed for the second axle is determined as a function of the determined synchronous target speed.

16 Claims, 6 Drawing Sheets

(51) Int. Cl.
| | | |
|---|---|---|
| *B60K 6/46* | (2007.10) | |
| *B60K 6/52* | (2007.10) | |
| *B60K 28/16* | (2006.01) | |
| *B60W 10/06* | (2006.01) | |
| *B60W 20/15* | (2016.01) | |
| *B60K 7/00* | (2006.01) | |
| *B60W 50/00* | (2006.01) | |

(52) U.S. Cl.
CPC ............ *B60K 28/16* (2013.01); *B60W 10/06* (2013.01); *B60W 20/15* (2016.01); *B60K 2007/0038* (2013.01); *B60K 2007/0092* (2013.01); *B60W 2050/0083* (2013.01); *B60W 2300/152* (2013.01); *B60W 2510/20* (2013.01); *B60W 2520/26* (2013.01); *B60W 2520/28* (2013.01); *B60W 2550/141* (2013.01); *B60W 2550/142* (2013.01); *B60W 2710/20* (2013.01); *B60W 2720/26* (2013.01); *B60W 2720/28* (2013.01); *B60Y 2200/221* (2013.01); *Y02T 10/6217* (2013.01); *Y02T 10/6243* (2013.01); *Y02T 10/6265* (2013.01); *Y02T 10/6286* (2013.01); *Y02T 10/7258* (2013.01); *Y10S 903/93* (2013.01)

(58) Field of Classification Search
USPC .......................................................... 701/22
See application file for complete search history.

(56) References Cited

U.S. PATENT DOCUMENTS

| | | |
|---|---|---|
| 2005/0087378 A1 | 4/2005 | Hrazdera |
| 2008/0190675 A1* | 8/2008 | Itoh .......................... B60K 6/52 180/243 |
| 2014/0129106 A1 | 5/2014 | Matsuzaki et al. |

FOREIGN PATENT DOCUMENTS

| | | |
|---|---|---|
| DE | 102007030168 | 1/2009 |
| EP | 1205331 | 5/2002 |
| WO | WO 2008/095067 | 8/2008 |

OTHER PUBLICATIONS

English Translation of the International Preliminary Report on Patentability for International (PCT) Patent Application No. PCT/EP2016/061428, dated Nov. 30, 2017, 8 pages.

International Search Report prepared by the European Patent Office dated Aug. 17, 2016, for International Application No. PCT/EP2016/061428.

* cited by examiner

METHOD FOR CONTROLLING A WHEEL ROTATIONAL SPEED OF AT LEAST ONE WHEEL OF A DRIVABLE AXLE OF A TWO-TRACK VEHICLE HAVING TWO DRIVABLE AXLES, AND TWO-TRACK VEHICLE HAVING AT LEAST TWO DRIVABLE AXLES

CROSS REFERENCE TO RELATED APPLICATIONS

This application is a national stage application under 35 U.S.C. 371 and claims the benefit of PCT Application No. PCT/EP2016/061428 having an international filing date of 20 May 2016, which designated the United States, which PCT application claimed the benefit of German Patent Application No. 10 2015 209 244.5 filed 20 May 2015, the disclosure of each of which are incorporated herein by reference in their entireties.

The invention relates to a method for controlling a wheel speed of at least one wheel of a drivable axle of a two-track vehicle with two drivable axles, particularly to a method for controlling a wheel speed of at least one wheel of a drivable axle of a vehicle that is embodied as a tractor or as a self-driving work machine with two drivable axles. The invention further relates to a corresponding two-track vehicle with two drivable axles.

Methods for controlling a wheel speed of at least one wheel of a drivable axle of a two-track vehicle with two drivable axles are inherently known from the prior art, for example from passenger cars with all-wheel drive.

In most such methods, the wheel speed of at least one wheel is controlled in a traction-optimized manner, that is, with the aim of achieving the greatest possible traction with the respective wheel or with the vehicle, whereby the power output from a drive motor is generally distributed to the individual wheels such that each of the wheels is driven with optimum slip in relation to the ground or roadway, with the optimum slip of a wheel being the difference between the wheel circumferential speed of the wheel and the current vehicle speed relative to the respective driving surface in relation to the current vehicle speed at which the greatest traction is achieved. The slip is generally controlled by controlling the wheel torque.

In passenger cars with all-wheel drive, which generally have one drivable front axle and one drivable rear axle, a so-called transfer case is usually provided for this purpose with which the power output from the drive motor can be distributed in a situationally adapted manner between the axles, particularly between the individual wheels of the axles. For example, if it is recognized that one or both wheels of the rear axle are spinning, that is, have too much slip or excessive wheel speeds for the detected vehicle speed, the drive power can be reduced by means of the transfer case on the rear axle or of the individual wheels of the rear axle and increased on the front axle, whereby the wheel speeds on the rear axle or on the relevant spinning wheels can again be reduced, so that the wheels are operated with optimum slip and hence again with the greatest possible traction in relation to the driving surface. Through the redistribution of the drive power between the rear axle and the front axle, the traction of the vehicle can be improved without the need to reduce the overall drive power.

In passenger cars with all-wheel drive that are embodied as hybrid vehicles having not only a first drive motor, which is generally a combustion engine, but also a second drive motor of a different type, which is generally an electric machine that can be operated as an electric motor, there is generally no transfer case provided with which the power output by the first drive motor can be distributed between the axles, particularly between the rear axle and the front axle; instead, the first drive motor is generally coupled with one of the two axles, usually the rear axle, whereas the second drive motor is provided to drive the other axle. If excessive slip or spinning of the wheel is detected on at least one wheel of the axle that is driven by the first drive motor—on the rear axle, for example—the traction can be improved by reducing the drive power of the associated drive motor on this axle and having a corresponding drive power be applied to the other axle by means of the other drive motor, for example by means of the electric motor, in order to achieve improved traction with the same overall drive power.

A vehicle of this generic type as well as a method of this generic type for controlling the wheel speeds is known, for example, from EP 1 205 331 A2 and from WO 2008/095067 A1. In the meantime, a number of all-wheel-drive work machines have become known, such as agricultural machines or construction machines, particularly tractors and self-driving driving work machines, that have corresponding control systems for controlling the wheel speeds.

The redistribution of the drive power between the individual axles is subject to limits, particularly physical ones. For example, a redistribution of the drive power—from the rear axle to the front axle, for instance—can only be achieved without reducing the overall drive power if the wheels of the front axle are not yet at the traction limit—that is, only if the wheels on the front axle are not yet spinning and can still transfer the desired drive power to the driving surface.

In addition, for optimal drivability, particularly for good traction and for the maximally energy-efficient operation of the vehicle, the wheel circumferential speed of the wheels of the axle on which the drive power is to be increased should be adapted to the wheel circumferential speed of the wheels of the other axle—that is, the wheel circumferential speeds of the wheels of the axle on which the drive power is to be adjusted as a function of the wheel circumferential speed of the wheels of the other axle should be adjusted relative to the wheel circumferential speed of the wheels of the other axle, and particularly only differ therefrom within certain limits. After all, if the wheel circumferential speeds of the wheels of the driven axles differ too greatly, this can result in increased tire wear and to increased drive power losses.

It is an object of the present invention to provide an alternative method, particularly an improved method, for controlling a wheel speed of at least one wheel of a drivable axle of a two-track vehicle with two drivable axles with which, particularly in at least some driving situations, the traction of the vehicle can be improved and with which more energy-efficient operation of the vehicle is preferably possible.

This object is achieved by means of a method according to the teaching of claim 1 and with a two-track vehicle according to the teaching of claim 13. Preferred embodiments of the method according to the invention and of the vehicle according to the invention are the subject matter of the dependent claims. The wording of the claims is incorporated into the content of the description by express reference.

The method according to the invention relates to the controlling of a wheel speed of at least one wheel of a drivable axle of a two-track vehicle with two drivable axles, particularly the controlling of a wheel speed of at least one wheel of a drivable axle of a vehicle that is embodied as a tractor or as a self-driving work machine with two drivable axles, wherein the vehicle has a first drivable axle with at least two wheels, a second drivable axle with at least two wheels, a first drive motor, at least one second drive motor, a device for detecting driving state variables in order to identify a driving state of the vehicle, and a control device.

The first drive motor is provided to drive at least one wheel of the first axle, and the second drive motor is provided to drive at least one wheel of the second axle. The device for detecting driving state variables is designed at least for this purpose of detecting an actual speed of the first axle, and the control device is designed to determine, at least as a function of the detected actual speed of the first axle, a target speed for the at least one wheel of the second axle and to control at least the second drive motor such that the desired target speed is achieved on the at least one wheel of the second axle.

The method comprises the following steps: Detecting an actual speed of the first axle, determining the target speed for the at least one wheel of the second axle at least as a function of the actual speed of the first axle, and controlling of at least the second drive motor such that the determined target speed is achieved on the at least one wheel of the second axle.

In terms of the invention, the actual speed of the first axle is the current detected wheel speed of the first axle, although the actual speed can be both the current wheel speed of one wheel of the first axle and a wheel speed that is determined from the wheel speeds of a plurality of wheels or from the wheel speeds of all of the wheels of the first axle.

In terms of the invention, the target speed that is determined for at least one wheel of the second axle is the wheel speed that is to be achieved on at least one wheel of the second axle.

In the methods according to the invention, in order to determine the target speed, a synchronous target speed is first determined as a function of the actual speed of the first axle and then the target speed is determined as a function of the determined synchronous target speed. The synchronous target speed is the target speed at which the same wheel circumferential speed is achieved on at least one wheel of the second axle as on the wheels of the first axle.

That is, in other words, the target speed for at least one wheel of the second axle is not determined according to the invention directly from the actual speed of the first axle; rather, the actual speed is first correct to the wheel speed at which the same wheel circumferential speed is achieved on at least one wheel of the second axle as on the wheels of the first axle, with this wheel speed being termed the synchronous target speed, and only then is the target speed determined as a function of the corrected actual speed, that is, in accordance with the synchronous target speed.

In terms of the invention, "wheel circumferential speed" is understood to refer to the speed at the outer wheel circumference, that is, the speed of the tread of the tire. If the wheel or the tire of the wheel is able to roll freely on the driving surface, the wheel circumferential speed nearly matches the vehicle speed, and the slip—that is, the difference between the wheel circumferential speed and the current vehicle speed relative to the driving surface in relation to the current vehicle speed—is nearly zero. In contrast, if the wheel is spinning, the wheel circumferential speed is substantially greater than the current vehicle speed relative to the driving surface, and the slip is great, with the slip being positive in this case. On the other hand, if the wheel locks and the vehicle slides over the driving surface with a wheel that is stationary because it is locked, the wheel circumferential speed is substantially less than the current vehicle speed relative to the driving surface, and the slip is also great, but negative.

By using the synchronous target speed as the basis for determining the target speed instead of the actual speed of the first axle, both the negative effect that different tire dimensions, different wear states, and/or different tire pressures of the wheels of both axles result in different outside wheel diameters and the consequent occurrence of different wheel circumferential speeds, on the one hand, and the negative effect that different wheel circumferential speeds occur on the two axles as a result of different tolerances in the drivetrains of the axles given the same set wheel speed, on the other hand, can be reduced and, in some cases, even completely compensated for and thus corrected.

This enables greater flexibility to be achieved in the selection of the tire dimensions for the individual drivable axles.

Furthermore, improved traction can be achieved in many driving situations, since the wheel circumferential speed of at least one wheel of the second axle relative to the wheel circumferential speed of the wheels of the first axle can be adjusted with greater precision; that is, the wheel circumferential speed of at least one wheel of the second axle can be better adapted to the wheel circumferential speed of the wheels of the first axle.

In particular, the method according to the invention enables the same wheel circumferential speed to be set on at least one wheel of the second axle as on the wheels of the first axle—that is, synchronization can be achieved—with a synchronization of the second axle with the first axle being achieved when the target speed is equal to the synchronous target speed, whereby optimal traction can even be achieved in many driving situations.

The synchronization enables the vehicle to be operated in an especially energy-efficient manner. In particular, drive power losses can be reduced, and increased tire wear occurring as a result of different wheel circumferential speeds of the wheels of the first axle and of the wheels of the second axle can be prevented.

By virtue of the improved traction of the vehicle, higher levels of tractive power can be achieved, and the vehicle can be operated in a more energy-efficient manner, since improved traction and thus less slip are directly associated with lower fuel consumption.

Since additional load weights are no longer necessarily required with the aid of a method according to the invention, a method according to the invention also offers the advantage that, as a result, unwanted soil compaction—which depends directly on the vehicle weight and increases as the vehicle weight increases—such as that which occurs when a field is driven over by a tractor can be reduced.

The elimination of the additional load weights that is made possible by the method according to the invention also has the advantage that the so-called bulldozing effect can be reduced, since the vehicle or the wheels or tires thereof no longer dig so deeply into the ground due to the lighter weight of the vehicle. As a result, the wedge of soil against which the tires roll is smaller than in a comparable vehicle that requires load weights in order to improve traction, which results in less rolling resistance and thus less tractive resistance, which, in turn, results in an additional reduction in fuel consumption.

In terms of the invention, a method for controlling a wheel speed of at least one wheel of a drivable axle of a two-track vehicle with two drivable axles is understood to be a method that is designed to have a targeted influence on the wheel speed of at least one wheel of a drivable axle of a two-track vehicle with two drivable axles. A feedback of the wheel speed is not absolutely necessary here, but it is of course possible, so that a method according to the invention also includes a method for regulating a wheel speed of at least one wheel of a drivable axle of a two-track vehicle with two drivable axles having the features of a method according to the invention.

In terms of the invention, the "wheel speed" is understood to be the number of revolutions of a wheel within a defined period of time, such as the number of revolutions of a wheel per minute.

A "drivable axle" is understood in terms of the invention to be an axle that can be driven by means of a drive motor—that is, an axle with which the drive power of at least one drive motor can be transferred to at least one wheel.

A "two-track vehicle" is understood in terms of the invention to be a vehicle whose wheels roll in at least two tracks.

In terms of the invention, a "tractor" is understood to be a tractor unit that is used in agriculture for pulling or even for driving agricultural machines and/or equipment.

A "self-driving work machine" is understood in terms of the invention to be a two-track motor vehicle which, due to its design and special equipment that is securely connected to the vehicle, is intended and suitable for performing work but not for the transporting of people or goods (Sec. 2, No. 17 of the Vehicle Registration Regulation [FZV]). Some examples of self-driving work machines are harvesting machines, combine harvesters, construction machines, and various special machines such as truck-mounted cranes and the like.

The first axis is preferably a rear axle and the second axle a front axle. As will readily be understood, however, the first axle can also be the front axle and the second axle the rear axle.

A "driving state variable" is understood in terms of the invention to be a variable that is suitable for describing a driving state of the vehicle at least in part. Typical driving state variables include the driving dynamic state variables according to DIN 70000, such as vehicle speed, vehicle longitudinal acceleration, vehicle transverse acceleration, yaw angle, pitch angle, roll angle, yaw rate, pitch rate, roll rate, and the like, as well as variables such as the wheel speeds of the individual wheels, slip of the individual wheels in relation to the driving surface, steering angle, steering angle speed, wheel steering angle, gas pedal position, or the braking pressure.

In an advantageous embodiment of the method according to the invention, the synchronous target speed is determined by applying a predefined synchronous correction factor to the actual speed of the first axle, with the synchronous target speed preferably being calculated by multiplying the actual speed of the first axle by the synchronous correction factor. Preferably, the synchronous correction factor is stored in the control device as a parameter for this purpose.

The use of a synchronous correction factor, particularly the use of a predefined synchronous correction factor that is stored as a parameter in the control device, enables the synchronous target speed to be determined in a simple manner as a function of the actual speed of the first axle.

The value of the synchronous correction factor that is to be stored in the control device is preferably determined by detecting a current actual speed of the first axle and a current actual speed of the second axle, preferably at the same time, at regular intervals during a trip on a solid driving surface, and then calculating the quotient from the detected actual speed of the second axle and the detected actual speed of the first axle, with the result of this quotient being the value of the synchronous correction factor that can be stored as a parameter in the control device.

The value of the synchronous correction factor can thus be determined by means of a drive on a solid driving surface, which is simple and requires little effort. Based on the assumption that, during a drive on a solid driving surface, the wheels of the first axle roll at approximately the same wheel circumferential speed as the wheels of the second axle, different tire dimensions, different wear conditions, and/or different tire pressures of the wheels of the two axles result in different actual speeds of the two axles; that is, they lead to an actual speed of the second axle that differs from the actual speed of the first axle and thus to a value for the synchronous correction factor that deviates from one.

A "solid driving surface" is understood in terms of the invention to be a driving surface that results in a coefficient of static friction of $\mu > 0.8$ between tires and driving surface—such as a dry, asphalt or concrete street.

For the actual speed of the second axle, the same applies analogously as for the actual speed of the first axle, to wit: in terms of the invention, the actual speed of the second axle is the current detected wheel speed of the second axle, whereby the actual speed of the second axle can be both the current wheel speed of one wheel of the second axle and a wheel speed that is determined from the wheel speeds of a plurality of wheels or from the wheel speeds of all of the wheels of the second axle.

In an advantageous embodiment of the method according to the invention, the recalculation of the synchronous correction factor is performed automatically in regular, predefined intervals when a solid driving surface is recognized on the basis of the detected driving state variables or on the basis of a manually input driver request, for example after a wheel change or after a change in tire pressure.

If the value of the synchronous correction factor is re-determined at regular intervals, wear conditions and/or tire pressures of the wheels that change over the travel time can not only be compensated for with the method according to the invention by means of the synchronous correction factor, but also identified on the basis of the synchronous correction factor.

In another advantageous embodiment of the method according to the invention, when a predefined synchronous correction factor threshold value is achieved—that is, if the value of the synchronous correction factor reaches the predefined synchronous correction factor threshold value—an alert message is therefore output.

In an especially preferred embodiment of a method according to the invention, a recalculation of the synchronous correction factor is performed only if the slip on the wheels whose wheel speeds enter into the actual speed of the first axle and into the actual speed of the second axle lies below a predefined limit, particularly only if the slip on all of the wheels of the first axle and of the second axle is approximately zero. The synchronous correction factor can be determined in an especially precise manner in this way.

In a further development of a method according to the invention, the target speed is additionally determined as a function of a differential speed ratio that defines the difference between the wheel circumferential speed of at least one wheel of the second axle and the wheel circumferential speed of the wheels of the first axle, with the differential speed ratio being preferably determined by applying a predefined differential correction factor to the determined synchronous target speed.

By applying a predefined differential correction factor, which is preferably indicated in percent, to the synchronous target speed, the target speed of the second axle can be adjusted in a targeted manner relative to the actual speed of the first axle. In particular, a forerun (i.e., a higher wheel circumferential speed of at least one wheel of the second axle in relation to the wheels of the first axle), a synchronization (i.e., the same wheel circumferential speed), or a lag (i.e., a lower wheel circumferential speed) can thus be set in an especially simple, targeted manner, with the same wheel circumferential speed being preferably achieved on at least one wheel of the second axle when the differential correction factor is zero.

By virtue of the possibility of intentionally setting a forerun, a synchronization, or a lag of at least one wheel of the second axle in relation to the wheels of the first axle depending on the driving situation, the wheel circumferential speed of at least one wheel of the second axle can always be adapted to the respective driving situation, for example to the driving surface, a slope gradient, or to certain driving maneuvers such as starting while traveling uphill or downhill. Furthermore, the targeted setting of a forerun, synchronization, or lag can have a stabilizing effect in certain driving situations and counteract under- or oversteering, for example.

For example, through the targeted setting of a synchronization, understeering in the sense of the pushing-outward of the vehicle over the front wheels on a curve, which is problematic on steep terrain, can be prevented. As explained previously, synchronization also enables the vehicle to be operated in an especially energy-efficient manner.

In another advantageous embodiment, the differential correction factor is predefined at least for some driving situations such that, in these driving situations, the best possible traction and hence particularly the best possible tractive performance of the vehicle is achieved in each case.

In another advantageous embodiment of a method according to the invention, in which the device for detecting driving state variables is designed to detect not only the actual speed of the first axle, but also an additional driving state variable, at least one additional driving state variable is detected, and the differential correction factor is determined as a function of at least one other, detected driving state variable by means of a predefined characteristic map and/or through a predefined mathematical function that is dependent on at least one other, detected driving state variable.

Preferably, the differential correction factor is determined as a function of a vehicle speed and/or a gas pedal position and/or a braking pressure and/or a steering wheel angle and/or a vehicle inclination and/or a slope gradient and/or a terrain condition input by a driver and/or a desired route input by the driver. As will readily be understood, the differential correction factor can also be determined as a function of other driving state variables that are not listed here. However, it has proven to be especially advantageous if the differential correction factor is determined as a function of at least one variable that describes the vehicle speed, a vehicle acceleration, a braking condition, a steering condition, and/or a terrain condition.

In terms of the invention, "terrain condition" refers to the condition and orientation—that is, the slope gradient—of the driving surface on which the vehicle is traveling.

In another advantageous embodiment of a method according to the invention, the target speed is additionally determined as a function of a predefined slip-speed ratio, with the slip-speed ratio being used to set a desired slip of at least one wheel of the second axle in relation to the driving surface, particularly a slip with which maximally optimal traction can be achieved. The slip-speed ratio is preferably determined as a function of the actual speed of the first axle and/or as a function of at least one additional driving state variable that is detected by the device for detecting a driving state variable, particularly as a function of a vehicle speed and/or a gas pedal position and/or a braking pressure and/or a steering wheel angle and/or a vehicle inclination and/or a slope gradient and/or a terrain condition input by a driver and/or a desired route input by the driver.

Preferably, the slip-speed ratio is determined as a function of at least one detected driving state variable, particularly as a function of a terrain condition, by means of a predefined characteristic map and/or by the use of a mathematical function that is dependent on at least one additional, detected driving state variable.

In this way, it is possible to adjust the slip on at least one wheel of the second axle as a function of the driving state, particularly as a function of a terrain condition. Especially good traction can be achieved in this way, since the maximum road grip is achieved at different slip values depending on the driving surface; on dry asphalt, the maximum road grip is achieved with a slip of about 12%, for example, and at about 30% on dry gravel, for example.

As explained above in connection with the differential correction factor, the slip-speed ratio can of course also be determined as a function of other driving state variables that are not listed here. However, it has also proven to be especially advantageous if the slip-speed ratio is determined as a function of at least one variable that describes the vehicle speed, a vehicle acceleration, a braking condition, a steering condition, and/or a terrain condition.

In another advantageous embodiment of the method according to the invention, the target speed is determined as a function of the sum of the synchronous target speed, the differential speed ratio, and the slip-speed ratio, particularly through the sum of the synchronous target speed, the differential speed ratio, and the slip-speed ratio.

In another advantageous embodiment of the method according to the invention, in which the control device of the vehicle is designed to set a drive power that can be transferred to the first axle, the drive power transferred to the first axle is set such that, depending on the detected driving state, a desired slip is achieved on the wheels of the first axle in relation to the driving surface, particularly a slip with which maximally optimal traction can be achieved. Preferably, the drive power transferred to the first axle is set as a function of a vehicle speed and/or a gas pedal position and/or a braking pressure and/or a steering wheel angle and/or a vehicle inclination and/or a slope gradient and/or a terrain condition input by a driver and/or a desired route input by the driver.

In another advantageous embodiment of the method according to the invention, the vehicle is coupled with an implement and forms a pairing with the implement, with the vehicle forming a towing vehicle out of the pairing, with the implement having at least one drivable axle and with the control device of the vehicle being designed to set a drive power that can be transferred to the drivable axle. The drive power transferred to the drive axle of the implement can be set such that a desired slip is achieved on the wheels of the drive axle of the implement in relation to the driving surface as a function of a detected driving state, particularly a slip with which maximally optimal traction of the pairing can be achieved.

In another advantageous embodiment of the method according to the invention, the drive power transferred to the drivable axle of the implement can be set such that the same slip is achieved on all drive axles of the pairing, that is, the same difference between the wheel circumferential speed of the wheel and the current vehicle speed relative to the respective driving surface is achieved in relation to the current vehicle speed, or such that a decreasing slip is achieved over the drive axles of the pairing in the longitudinal direction in relation to the forward travel, that is, more slip occurs on the frontmost axle in relation to the direction of travel than on the middle axle, and more slip occurs on the middle axle than on the rearmost axle, or such that an increasing slip is achieved over the drive axles of the pairing in the longitudinal direction in relation to the forward travel, that is, less slip occurs on the frontmost axle in relation to the direction of travel than on the middle axle, and less slip occurs on the middle axle than on the rearmost axle.

However, the setting of a slip that decreases over the driven axles of the pairing in the longitudinal direction in relation to the forward travel has proven to be especially advantageous, since soil compaction by the leading wheels can be taken into account for the trailing, rear wheels, so that the wheels of all driven axles can each be driven in the optimal slip range and thus in the range of optimal road grip, whereby the traction and hence the transferable tractive power of the vehicle can be improved even more.

In another advantageous embodiment of the method according to the invention, in order to bring about a stretching of the pairing when starting while traveling downhill in the direction of forward travel, the drive power that is transferred to the drive axle of the implement can be set such that a leading negative slip of the wheels of the drivable axle of the implement in relation to the driving surface is achieved relative to the slip of the wheels of the first axle in relation to the driving surface and relative to the slip of the wheels of the second axle in relation to the driving surface— that is, a lag is produced in relation to the first axle and the second axle. A "stretching" of the pairing can be achieved in this way, thus improving the controllability of the pairing. As will readily be understood, such an adjustment of the drive power that is transferred to the drive axle of the implement is not limited to starting when traveling downhill, but can also be performed in other situations, particularly while traveling downhill.

In another advantageous embodiment of the method according to the invention, the slip can be set such that a desired defined stretching is achieved, with it being possible for the defined stretching to be preferably adjusted as a function of the driving state. This is advantageous particularly when starting downhill in the direction of forward travel and when braking the pairing, particularly when braking while traveling downhill, since the stability of the pairing can generally be improved through the defined stretching of the pairing.

In another advantageous embodiment of the method according to the invention, in order to set a defined slip, particularly a defined stretching, while starting in the direction of forward travel while traveling downhill and/or while braking the pairing, the drive power to be transferred to the wheels of the drivable axle can be adjusted additionally or alternatively by means of an associated braking device.

In another advantageous embodiment of the method according to the invention, in order to bring about a compressing of the pairing when starting while traveling uphill in the direction of forward travel, the drive power that is transferred to the driven axle of the implement is set such that a leading positive slip of the wheels of the drivable axle of the implement in relation to the driving surface is achieved relative to the slip of the wheels of the first axle in relation to the driving surface and relative to the slip of the wheels of the second axle in relation to the driving surface— that is, a forerun is produced in relation to the first axle and the second axle, the drivable axle of the implement in relation to the driving surface. In this way, a "compressing" of the pairing can be brought about by means of which the danger of an abrupt loss of road grip of the wheels of the first axle can be reduced, particularly if the first axle is the rear axle of the vehicle. On the other hand, this can counteract a relieving of the second axle, which would also result in a reduction in traction and thus to a loss of tractive power, particularly if the second axle is the front axle of the vehicle. As will readily be understood, such an adjustment of the drive power that is transferred to the driven axle of the implement is not limited to starting when traveling uphill, but can also be performed in other situations, particularly during uphill travel.

In another advantageous embodiment of the method according to the invention, the vehicle additionally has a third drive motor that is also provided for the purpose of driving at least one wheel of the second axle, with the second drive motor being provided to drive a left wheel of the second axle and the third drive motor being provided to drive a right wheel of the second axle, and with the control device being designed to determine, at least as a function of the detected actual speed of the first axle, a target speed of the left wheel of the second axle and a target speed of the right wheel and to control at least the second and third drive motors that are provided to drive the second axle such that the desired target speed is achieved on the left wheel and on the right wheel, respectively, the method comprises the steps: Detecting an actual speed of the first axle, determining the target speed for the left wheel of the second axle and for the right wheel of the second axle at least as a function of the actual speed of the first axle, and controlling the second drive motor and the third drive motor such that the determined target speed is achieved on the left wheel and on the right wheel of the second axle.

In other words, this means that, if an additional, namely a third drive motor is provided that is also intended to drive the second axle, with the second drive motor being provided to drive the left wheel of the second axle and the third motor to drive the right wheel, a target speed is preferably determined for the left wheel of the second axle and, as a function thereof, a target speed for the right wheel of the second axle. Especially good traction can be achieved in this manner. If the wheel speeds of the wheels of the first axle are each detected separately, even better traction can be achieved, since an even better adaptation of the wheel circumferential speeds of the wheels of the second axle to the wheel circumferential speeds of the wheels of the first axle can be achieved.

In another advantageous embodiment of the method according to the invention, the synchronous target speed and/or the differential speed ratio and/or the slip-speed ratio is preferably determined for the left wheel of the second axle and for the right wheel of the second axle, respectively.

In another advantageous embodiment of the method according to the invention, a control variable is determined for controlling a drive motor, preferably separately for each drive motor, as a function of the associated detected actual speed of the respective axle and/or of the respective wheel of the axle, with the control variable being preferably limited to a maximum control variable value when a predefined control variable threshold is exceeded.

A "control variable" is understood in terms of the invention to be the variable with which the respective drive motor can be influenced in such a targeted manner that a desired target speed is achieved on at least one wheel of the associated axle, with the respective control variable with which the first drive motor and/or the second drive motor and/or the third drive motor can be controlled being preferably a target torque.

A "control variable threshold" is understood in terms of the invention to be a limit value for a control variable.

The associated control variable threshold is preferably determined in each case as a function of the driving state, particularly as a function of a vehicle speed and/or a gas pedal position and/or a braking pressure and/or a steering wheel angle and/or a vehicle inclination and/or a slope gradient and/or a terrain condition input by a driver and/or a desired route input by the driver and/or a state of the drive motor. The control variable threshold is preferably determined in each case by means of a predefined characteristic map and/or by means of a predefined mathematical function.

With the aid of the limiting of the control variable, which essentially represents a power limit, an additional increase in the drive torque on the axle on which the drive power is to be increased can be prevented particularly from resulting in the spinning of the wheels, so that the drive power is consequently only increased until the point is reached at which the traction worsens again when the slip limit or the road grip limit is exceeded.

In another advantageous embodiment of the method according to the invention, in order to determine the control variable of the second drive motor, an actual speed of the second axle and/or of a wheel of the second axle is detected and compared with the associated target speed and a control deviation of the actual speed from the target speed is determined, in which case the control variable that is required in order to achieve the required target speed on the second axle or the associated wheel of the second axle is determined as a function of the determined control deviation, preferably by means of a governor.

If the governor—with which, as a function of the control deviation between actual speed and target speed of the second axle, the control variable is determined that can be limited to a maximum control variable value when a predefined control variable threshold is exceeded—contains an integral portion, the integration of the deviation of the limited control variable from the unlimited control variable can lead to instability on the part of the governor and thus to an unwanted overshooting of the control variable. This can be prevented through the implementation of a so-called anti-windup function. The implementation of anti-windup functions in a control system is inherently known from the prior art. For more detailed explanations in this regard, reference is made to the relevant specialist literature from the area of control engineering.

Therefore, in an advantageous embodiment of a method according to the invention, in order to prevent the overshooting of the control variable, at least one control variable, preferably every control variable, particularly a respective limited control variable, is fed back in order to achieve a so-called anti-windup function, with the control variable being preferably fed back such that the control variable can be determined as a function of the determined control deviation between actual speed and target speed of the second axle and as a function of the fed-back control variable. An overshooting of the governor, with the aid of which the control variable is determined as a function of the control deviation between actual speed and target speed of the second axle, can be prevented in this way.

In another advantageous embodiment of the method according to the invention, particularly for a drive mode of the vehicle while traveling obliquely or transversely across a slope in which the second axle forms the front axle of the vehicle, the differential speed ratio for determining the target speed of the downhill-side front wheel is selected so as to be greater than the differential speed ratio for determining the target speed of the uphill-side front wheel in order to counteract the downward drifting of the vehicle caused by the downgrade force.

In terms of the invention, "traveling obliquely across a slope" is understood to refer to traveling with the direction of travel oblique to the slope, that is, diagonally to a slope gradient. In terms of the invention, "traveling transversely across a slope" is understood to refer to traveling with the direction of travel substantially transverse to the slope, that is, transverse to a slope gradient. The downhill-side front wheel is the front wheel that is facing toward the valley or the valley side—that is, the front wheel on the downward slope side. Accordingly, the uphill-side front wheel is the front wheel that is facing toward the mountain or the mountain side—that is, the front wheel on the upward slope side.

Through such a targeted, separate adjustment of the wheel circumferential speeds of the wheels of the second axle and, in this case, of the front axle, an especially high level of vehicle control can be achieved while traveling transversely across a slope.

The respective differential speed ratios of the downhill-side front wheel and of the uphill-side front wheel are preferably determined as a function of a detected vehicle inclination and/or a detected slope gradient and/or detected steering forces.

In another advantageous embodiment of the method according to the invention, particularly for the autonomous drive operation of the vehicle while traveling transversely across a slope, with the vehicle being designed for autonomous drive operation and having a steering actuator for the autonomous adjustment of a wheel steering angle, the wheel steering angle and the respective differential speed ratio of the two front wheels are set during an autonomously executed trip, preferably during autonomously-performed travel transversely across a slope, as a function of a detected slope gradient and/or as a function of detected steering forces such that a tractive resistance of the vehicle is reduced, preferably minimized.

In terms of the invention, "autonomous drive operation" is understood to be the automatic controlling of the vehicle on the basis of a predefined travel route, with the route having been preferably predefined by the driver and stored in the control device and held ready for the automatic controlling of the vehicle.

The term "tractive resistance" is understood to be the resistance that must be overcome in order to move the vehicle.

The reduction or minimization of the tractive resistance can be achieved in particular by setting the differential speed ratios of each of the two front wheels such that the smallest possible wheel steering angle is necessary for the associated driving state and/or the smallest possible wheel steering angle is necessary for the predefined route, and thus the smallest possible steering angle input. In other words, the differential speed ratios of the two front wheels are preferably each set such that, in addition to a wheel steering angle portion that is required for the desired direction of travel, preferably no wheel steering angle portion need be applied to the front wheels in order to keep the vehicle on the desired route and particularly to prevent the downward drifting of the vehicle.

The smaller the required wheel steering angle, the less the front wheels are pushed obliquely over the driving surface and the lower the friction losses, the tractive resistance, and the required tractive power, which has an especially advantageous effect particularly when traveling transversely across a slope or when operating the vehicle with an implement for so-called "heavy soil treatment," such as when operating a plow as an implement.

Preferably, the autonomous drive operation can be interrupted as soon as a steering angle speed that is inputted by the driver exceeds a predefined limit value.

The two-track vehicle according to the invention with at least two drivable axles, particularly a two-track vehicle that is embodied as a tractor or as a self-driving work machine having at least two drivable axes, has a first drivable axle with at least two wheels, a second, drivable axle with at least two wheels, a first drive motor, at least one second drive motor, a device for detecting driving state variables for identifying a driving state of the vehicle, and a control device, wherein the first drive motor is provided to drive at least one wheel of the first axle, wherein the second drive motor is provided to drive at least one wheel of the second axle, wherein the device for detecting driving state variables is designed to detect an actual speed of the first axle, and wherein the control device is designed to determine, at least as a function of the detected actual speed of the first axle, a target speed for the at least one wheel of the second axle and to control the second drive motor such that the desired target speed is achieved on the at least one wheel of the second axle.

A vehicle according to the invention is particularly designed to execute a method according to the invention.

In an advantageous embodiment of the vehicle according to the invention, the second axle can be driven completely independently, that is, such that it is not mechanically coupled with the first axle. The increased torque-loading of a gearbox brought about in conventional vehicles that are known from the prior art as a result of different actual speeds of the first axle and second axle, which gearbox is generally located in the output flow direction between the first drive motor and one of the two axles, particularly the increased torque-loading of the gear teeth, which can lead to increased wear and damage to the gears, can thus be prevented in an advantageous manner. As a result, the gearbox can designed to have smaller dimensions and thus be lighter.

In an advantageous embodiment of the vehicle according to the invention, it is a hybrid vehicle, with the first drive motor, which is provided for driving the first axle, being a combustion engine, and with the second drive motor, which is provided at least for driving a wheel of the second axle, being an electric machine that can be operated as an electric motor. Preferably, the vehicle also has an electric machine that can be operated as a generator and an electrical energy store, wherein the electric machine that can be operated as a generator can be driven by means of the combustion engine and is designed to output electrical energy to the electrical energy store and/or to the electric machine that can be operated as an electric motor, and wherein the electric machine that can be operated as an electric motor can be driven by means of the electrical energy made available by the generator and/or by the electrical energy store.

In terms of the invention, a "hybrid vehicle" is understood to be a vehicle with a hybrid drive, that is, a vehicle with at least two different energy converters as drive motors, for example with a combustion engine for driving the first axle and an electric motor for driving the second axle, or vice versa.

In another advantageous embodiment of the vehicle according to the invention, the electric machine that can be operated as a generator is designed not only to deliver electrical power to the electrical energy store and/or to the electric machine that can be operated as an electric motor, but also to deliver electrical power to vehicle loads and/or at least one implement, for example to a trailer with an electrically drivable axle or to an implement with an electrically drivable axle.

Preferably, the electrical power output by the generator and transferable to a drivable axle of the implement can be adjusted in a targeted manner, particularly such that the drive power of an electrical axle of an implement that is coupled with the vehicle to form a pairing can be adjusted in a traction-optimized manner, so that the overall tractive power of the pairing can be maximized.

Especially preferably, the drive power that can be transferred to the drivable axle of an implement that is coupled with the vehicle can be adjusted such that a desired slip is achieved on the wheels of the drivable axle of the implement in relation to the driving surface as a function of a detected driving state, particularly a slip with which maximally optimal traction of the pairing can be achieved.

In another advantageous embodiment, the vehicle according to the invention has a gearbox in a power branch from the first drive motor to the first axle, with the electric machine that can be operated as a generator being arranged in this power branch between the first drive motor and the gearbox. Such an arrangement of the generator in the power branch between the first drive motor and the gearbox has the effect that the power output by the first drive motor can already be branched off before the gearbox, since a portion of the power can be diverted via the generator in order to generate the electrical energy for the electric machine that can be operated as an electric motor. As a result, the gearbox need not be designed for the power that is output by the first drive motor, but rather can be dimensioned smaller, thus enabling smaller-dimensioned gearboxes to also be used connection with drive motors with a higher power output.

In another advantageous embodiment, a vehicle according to the invention is embodied such that a portion of the power that can be diverted via the generator can be adjusted in a targeted, preferably situation-dependent manner. This makes an especially efficient gearbox possible, particularly a gearbox design that is especially advantageous in terms of the weight of the gearbox, since the gearbox need no longer withstand the loads occurring in all situations as a result of the power output by the first drive motor, but can instead be diverted in a targeted manner via the generator in load-critical situations.

In another advantageous embodiment of the vehicle according to the invention, all of the power output by the first drive motor can be diverted via the generator, so that the power output by the combustion engine can be utilized fully for generating electrical power for driving the second axle and/or for charging the electrical energy store.

On trips without excessive load requirements and without the need for all-wheel drive, such as on trips on paved roads and streets, for example, it is thus possible to move the vehicle only by electrically driving the second axle, while the drive of the first axle is deactivated. In that case, the power that is required to drive is preferably provided via the generator, which is driven by the combustion engine. One advantage of this mode is that the combustion engine can be operated in a speed range that is optimal for consumption and thus for efficiency, thus enabling the vehicle to be operated in a fuel-saving and thus efficient manner.

In another advantageous embodiment, the vehicle according to the invention has a clutch for separating the first axle from the first drive motor, with the clutch being especially preferably arranged in the output flow direction between the generator and the gearbox. The above-described mode in which the vehicle is moved only by the electrical driving of the second axle thus enables an especially efficient drive operation with an especially high level of efficiency, since friction losses can be reduced in particular. In comparison to vehicles that are known from the prior art, in which the all-wheel drive is usually switched on and off by means of multiple-disc clutches running on the bottom of the gearbox in the gearbox oil, the above-described arrangement of the clutch outside of the gearbox offers the advantage of an absence of high churning and drag losses, which increase as the driving speed increases and always occur with the vehicles that are known from the prior art, even with all-wheel drive turned off.

In another, alternative or additional, advantageous embodiment, a vehicle according to the invention as described above is designed to drive solely electrically—that is, only with an electric drive without the combustion engine running. This can be advantageous especially for short trips while driving slowly, particularly when maneuvering. Even a remote-controlled electric drive in which the driver is not located in the vehicle but outside of it is also conceivable. This could be a sensible application in a tractor, for example, in order to enable animal feed to be distributed very efficiently to stalls. A tractor could drive along the stable aisle by remote control with the combustion engine shut off and thus without producing any exhaust gases and offload the feed while the farmer walks next to or behind the vehicle and distributes the feed to the animals.

In another, especially advantageous embodiment, a vehicle according to the invention, particularly a hybrid vehicle according to the invention, is designed for energy recovery during brake operation; that is, it is designed to recover and/or to output an electrically generated drive torque (so-called "boosting") without additionally straining the combustion engine.

In another advantageous, alternative or additional embodiment, the electric machine that can be operated as a generator can also be operated as an electric motor, for example as a drive motor for the combustion engine, particularly as a starter motor for the combustion engine, or as a drive for a power take-off, particularly as a drive for a so-called "power take-off shaft," with it being possible for the electric machine to be supplied with electrical power while the combustion engine is shut off. This type of driving, which is referred to as "power take-off," is particularly known from tractors and can be used to power mechanically drivable implements, such as a wood splitter or the like, that are coupled with a stationary vehicle.

By virtue of the electrical driving of the power take-off by means of the "generator," which can be supplied with electrical power from the electrical energy store, and the switch-off of the combustion engine that this enables, people in the workspace of the implement are not exposed to the exhaust gases of the combustion engine. Furthermore, fuel consumption and $CO_2$ emissions can be reduced.

In another advantageous embodiment, the vehicle according to the invention additionally has a third drive motor, with the third drive motor also being provided for the purpose of driving the second axle at least partially. The second drive motor is preferably provided to drive a left wheel of the second axle, the third drive motor is provided to drive a right wheel of the second axle, and the control device is designed to determine, at least as a function of the detected actual speed of the first axle, a target speed of the left wheel of the second axle and a target speed of the right wheel and to control at least the second and third drive motors that are provided to drive the second axle such that the desired target speed is achieved on each of the left wheel and the right wheel. Preferably, the second drive motor and the third drive motor are each electric machines that can be operated as electric motors, particularly electric wheel hub motors.

With a wheel hub motor associated with the left wheel and one associated with the right wheel of the second axle, not only is it possible to achieve an adjustment of the wheel circumferential speeds of the wheels of the second axle that is especially precise and hence especially well adapted to the driving situation, it is also no longer necessary to provide a differential gear on the second axle. This results in considerable potential weight savings.

Moreover, if the second axle is a steerable axle, an especially tight turning circle (i.e., an especially small turning radius) can also be achieved by setting deliberately different wheel speeds, particularly deliberately different wheel circumferential speeds, on the wheels of the second axle. Furthermore, the traction can be improved even in the case of a large steering angle and consequently large wheel steering angles, particularly also at the maximum steering angle.

In an alternative, advantageous embodiment of the vehicle according to the invention, the first drive motor, which is provided to drive the first axle, is an electric machine that can be operated as an electric motor, and the second drive motor, which is provided at least to drive a wheel of the second axle, is also an electric machine that can be operated as an electric motor. Preferably, the vehicle also has a combustion engine and an electric machine that can be operated as a generator, as well as an electrical energy store, in which case the electric machine that can be operated as a generator can be powered by means of the combustion engine and is designed to deliver electrical power to the electrical energy store and/or to the respective electric machines that can be operated as an electric motor. The electric machines that can be operated as electric motors can each be powered by means of the electrical power made available by the generator and/or the electrical energy store. Preferably, the combustion engine has no mechanical connection to the first and/or second axle.

In another alternative, advantageous embodiment of the vehicle according to the invention, in order to drive the first axle, two electric machines that can each be operated as an electric motor are provided; in other words, the first drive motor is formed by two electric motors in this case, preferably by two wheel hub motors, with a wheel hub motor being preferably associated with a wheel of the first axle. Preferably, the vehicle also has a combustion engine and an electric machine that can be operated as a generator, as well as an electrical energy store, in which case the electric machine that can be operated as a generator can be powered by means of the combustion engine and is designed to deliver electrical power to the electrical energy store and/or to the respective electric machines that can be operated as electric motors. The electric machines that can be operated as electric motors can each be powered by means of the electrical power made available by the generator and/or the electrical energy store. Preferably, the combustion engine has no mechanical connection to the first and/or second axle.

These and other features and advantages follow not only from the claims and description, but also from the drawings, with it being possible for each of the individual features to be realized alone or together in the form of sub-combinations in an embodiment of the invention and inherently constitute an advantageous and patentable embodiment, for which protection is likewise claimed.

Some of the named features and characteristics pertain both to an inventive method and to an inventive vehicle. Some of these features and characteristics are only described once but apply independently of one another in the context of technically possible embodiments both for an inventive method and for an inventive vehicle.

In the following, the invention is explained in further detail on the basis of several exemplary embodiments, with the invention being illustrated schematically for this purpose in the enclosed drawings.

Figure 3:
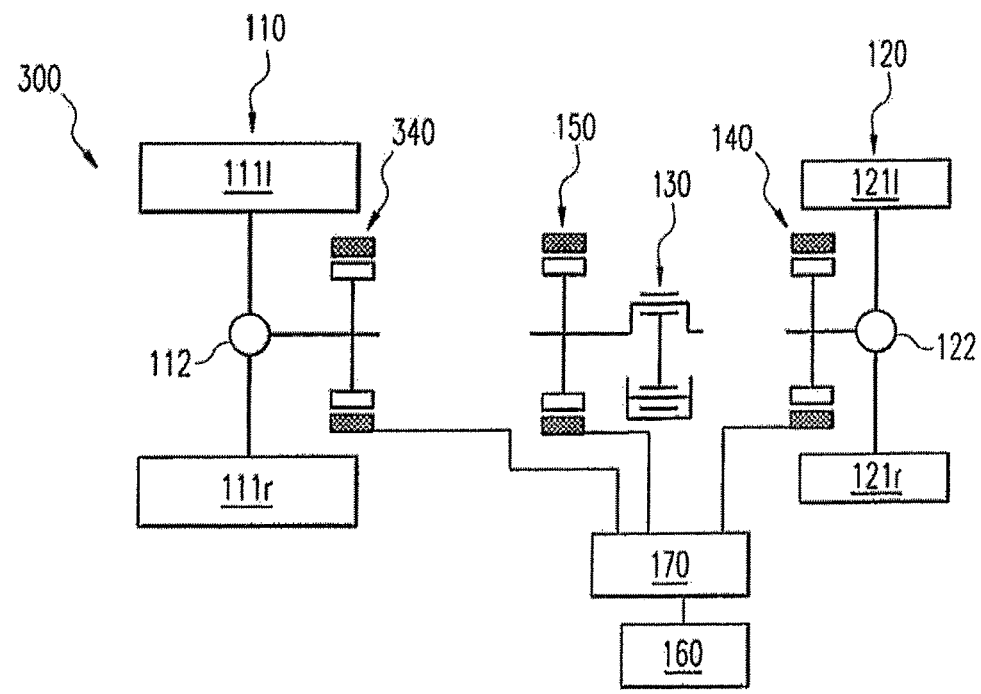
FIG. 3 shows a schematic representation of a third exemplary embodiment of a vehicle according to the invention.
Figure 4:
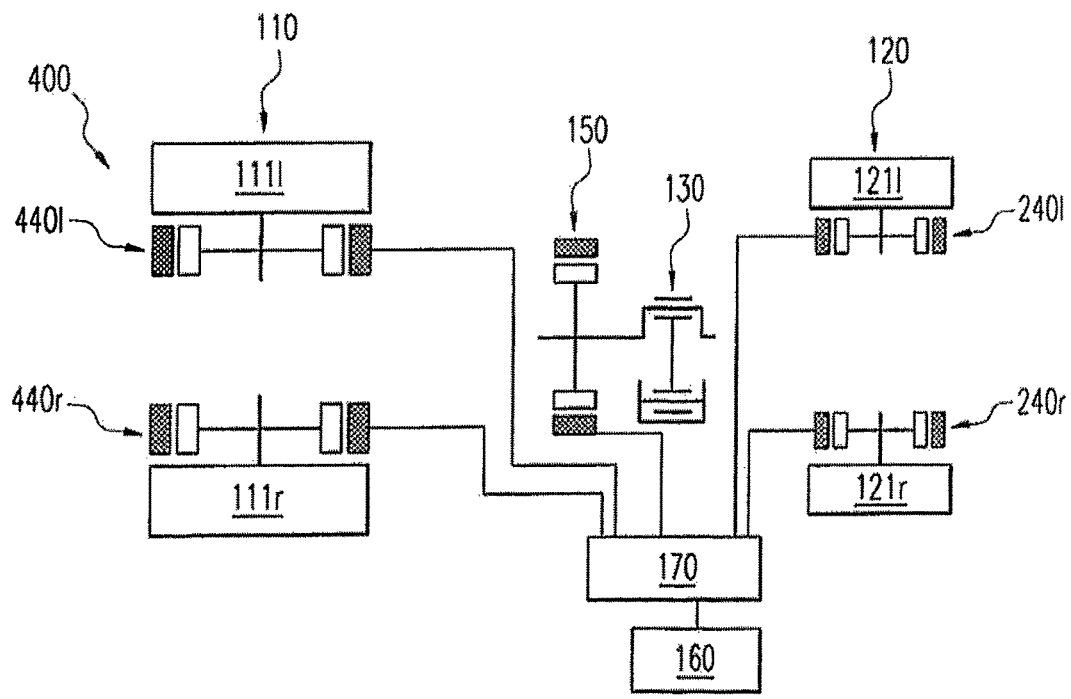
FIG. 4 shows a schematic representation of a fourth exemplary embodiment of a vehicle according to the invention.
Figure 7:
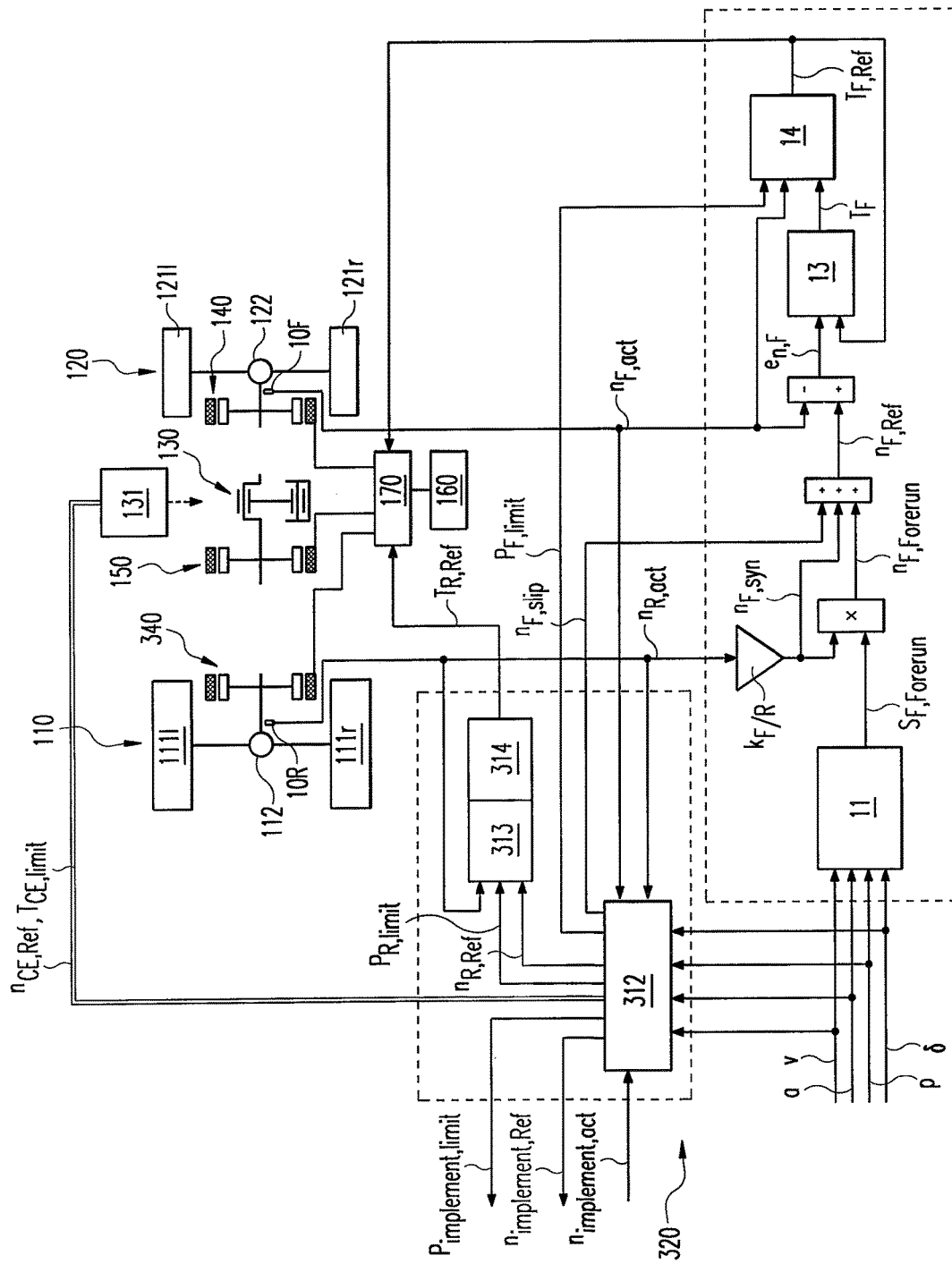
Figure 8:
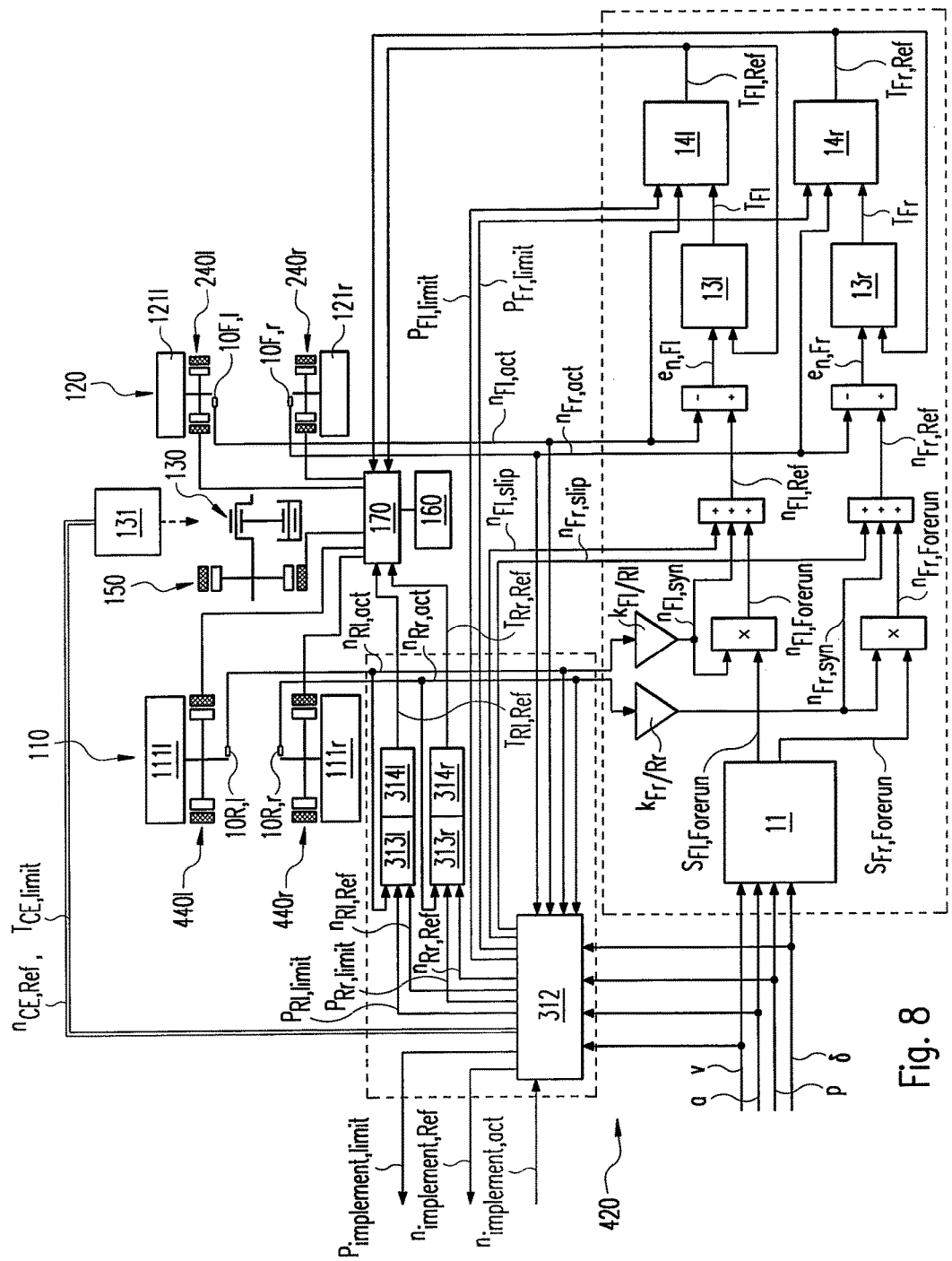

FIG. 7 shows a simplified block diagram illustrating a third exemplary embodiment of a method according to the invention for controlling the wheel speeds of the front wheels of the vehicle according to the invention from FIG. 3; and FIG. 8 shows a simplified block diagram illustrating a fourth exemplary embodiment of a method according to the invention for controlling the wheel speeds of the front wheels of the vehicle according to the invention from FIG. 4.

Figure 1:
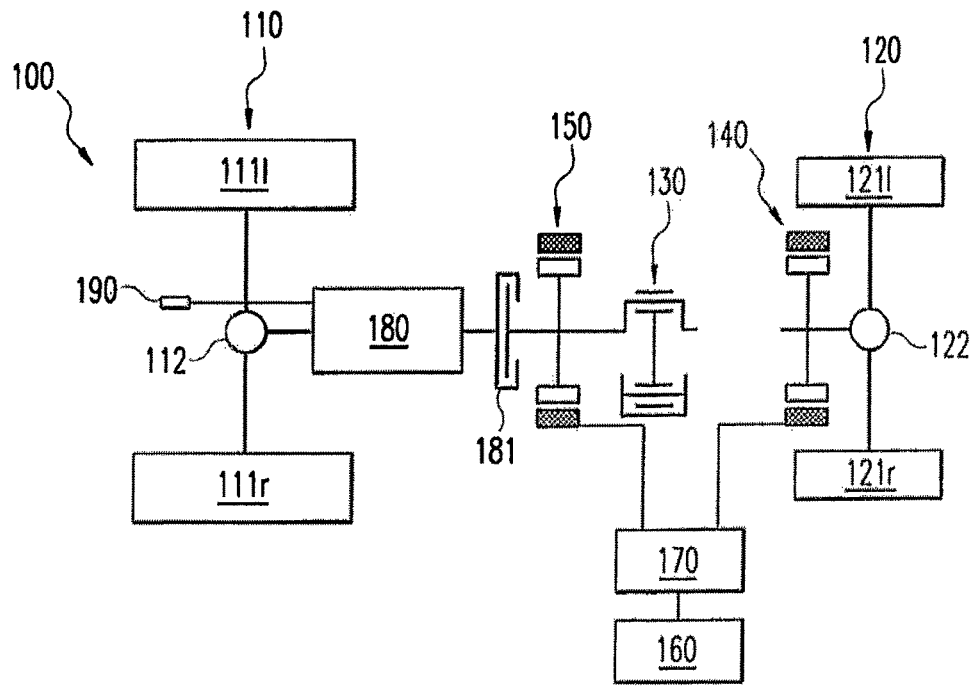
FIG. 1 shows a schematic representation of a first exemplary embodiment of a vehicle according to the invention.

The two-track vehicle 100 according to the invention shown schematically in FIG. 1 is a tractor in the form of a hybrid vehicle that is designed to execute a method according to the invention, with a first axle 110 that forms the rear axle and a second axle 120 that forms the front axle, with the rear axle 110 and the front axle 120 each having a left wheel $111_l$ or $121_l$ as well as a right wheel $111_r$ or $121_r$.

To drive the tractor 100, a first drive motor 130 and a second drive motor 140 are provided, with the first drive motor 130 being a combustion engine and the second drive motor 140 being an electric machine that can be operated as an electric motor. The combustion engine 130 is provided to drive the rear axle 110, while the electric motor 140 is provided to drive the front axle 120. The rear axle 110 and front axle 120 can be operated mechanically independently of one another—that is, the drivetrain of the rear axle 110, with which the power is transferred from the combustion engine 130 to the rear axle 110, is not coupled mechanically with the drivetrain of the front axle 120, with which the power is transferred from the electric motor 140 to the front axle 120.

Figure 5:
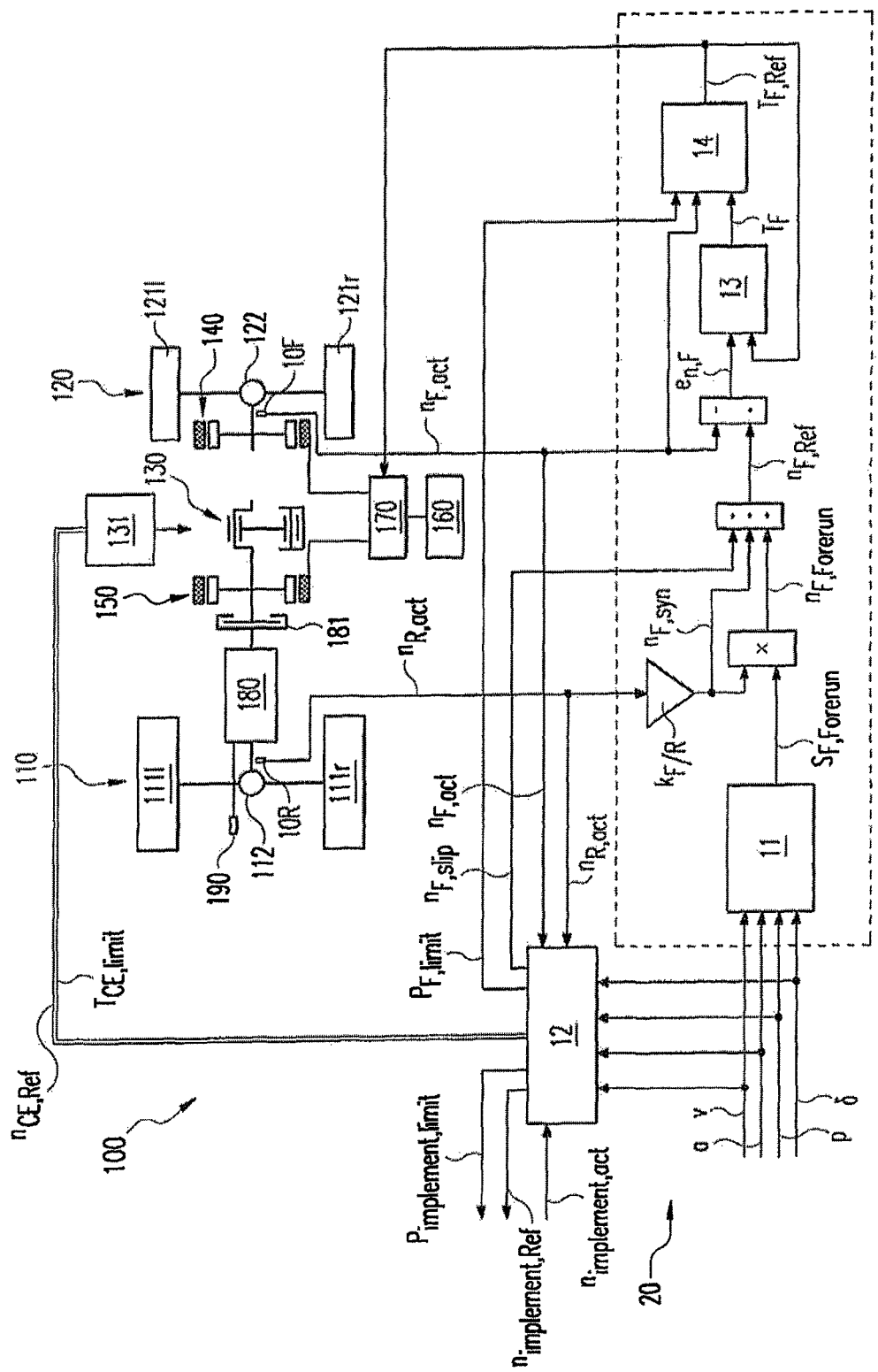
FIG. 5 shows a simplified block diagram illustrating a first exemplary embodiment of a method according to the invention for controlling the wheel speeds of the front wheels of the vehicle according to the invention from FIG. 1.

In order to enable the wheel speeds of the wheels $121_l$ and $121_r$ of the front axle 120 to be controlled according to a method according to the invention, the tractor also has a device (not shown in FIG. 1) for detecting driving state variables in order to determine a driving state, as well as a control device (also not shown in FIG. 1) by means of which, as a function of an actual speed of the rear wheels $111_l$ and $111_r$, a desired target speed for the wheels $121_l$ and $121_r$ of the front axle 120 can be determined and set, with the control device being designed to determine, as a function of the determined target speed, a corresponding control variable for controlling the electric motor 140 and to control power electronics 170 associated with the electric motor 140 such that the desired target speed is achieved on the front wheels $121_l$ and $121_r$; cf. FIG. 5.

The drivetrain of the rear axle 110 has a clutch 181, a gearbox 180, and a rear axle differential 112 as well as corresponding shafts, with it being possible for the power output by the combustion engine 130 to be conducted through the clutch 181 and the gearbox 180 to the rear axle differential 112, by means of which the drive power is distributed to the two rear wheels $111_l$ and $111_r$. The power transferred from the combustion engine 130 to the gearbox 180 can be diverted not only to the rear axle 110, but also through the so-called power take-off 190, which is referred to in the following as a so-called "PTO shaft" and represents an additional gearbox output that is designed for coupling with a mechanically drivable implement (not shown here), such as a wood splitter or the like.

The power output from the electric motor 140 is conducted to a front axle differential 122 and distributed to the two front wheels $121_l$ and $121_r$. The electric motor 140 can draw the energy required to drive the front axle 120 from an electrical energy store 160, provided that the latter is appropriately charged, and/or directly from an electric machine 150 that can be operated as a generator, with it being possible for the generator 150 to be driven by the combustion engine 130 in order to generate electrical energy.

The electrical energy generated by the generator 150 can be output appropriately to the electrical energy store 160 and to the electric motor 140. Furthermore, the electric machine 150 that is embodied as a generator can also output electrical energy to other loads of the vehicle 100 and/or to an electrically drivable implement (not shown here) that can be coupled with the tractor 100, for example to a trailer with an electrically drivable axle or another electrically drivable implement.

The generator 150 that is provided in order to make the electrical energy available to the electric motor 140 and to charge the electrical energy store 160 is advantageously arranged in the power branch from the combustion engine 130 to the rear axle 110, with respect to an output flow direction, between the combustion engine 130 and the gearbox 180. This arrangement offers the advantage that the power output from the combustion engine 130 can be branched off before the gearbox 180, and a portion of the power for generating the electrical energy for the electric machine that can be operated as an electric motor 140 can be diverted before the gearbox 180 through the generator 150. As a result, the gearbox 180 is not loaded with all of the power output from the combustion engine 130, but rather only by the power that is provided for driving the rear axle 110. Consequently, the gearbox 180 need not be designed for the maximum possible power output from the combustion engine 130, but can be given smaller dimensions, or the gearbox 180 can be used in conjunction with a combustion engine with a greater power output.

In this exemplary embodiment of a tractor 100 according to the invention, a portion of the power that is diverted through the generator 150 can also be adjusted in a targeted manner and thus adapted to the situation. This makes an especially advantageous gearbox design possible, since a portion of the power can be diverted through the generator 150 in load-critical situations.

Furthermore, it is possible in the depicted exemplary embodiment to utilize all of the power output from the combustion engine 130 to generate electrical energy for driving the front axle 120 and/or for charging the electrical energy store 160. On trips without excessive load requirements and without the need for all-wheel drive, such as on trips on paved roads and streets, for example, the tractor 100 can be moved by driving just the front axle 120 by means of the electric motor 140, while the drive for the rear axle 110 is deactivated. In that case, the power that is required to drive the front axle 120 is preferably provided via the generator 150, which is driven by the combustion engine 130. One advantage of this mode is that the combustion engine 130 can be operated in a speed range that is optimal for consumption and thus for efficiency, thus enabling the vehicle to be operated in a fuel-saving and thus efficient manner.

By opening the clutch 181, the drivetrain of the rear axle 110 can be separated, so that the rear axle 110 and the gearbox 180 are decoupled from the combustion engine 130. Friction losses can thus be reduced.

When the combustion engine 130 is shut off, the tractor 100 can also be driven only electrically, that is, only using an electrical drive. For this purpose, the electric motor 140 can be supplied with electrical energy by the electrical energy store 160.

Moreover, the electric machine 150 of the tractor 100 that can be operated as a generator can also be operated as an electric motor when the combustion engine 130 is shut off, for example as a starter motor for the combustion engine 130 or as a drive for the power take-off 190, i.e., as a drive for the "PTO shaft." For this purpose, the electric machine 150 can also be supplied with electrical energy by the energy store 160. This type of drive, which is also referred to as "power take-off," is advantageous particularly in vehicles such as the tractor 100 according to the invention shown here in order to drive a mechanically drivable implement, such as a wood splitter or the like, that is coupled with the tractor 100 while the tractor 100 is stationary.

Figure 2:
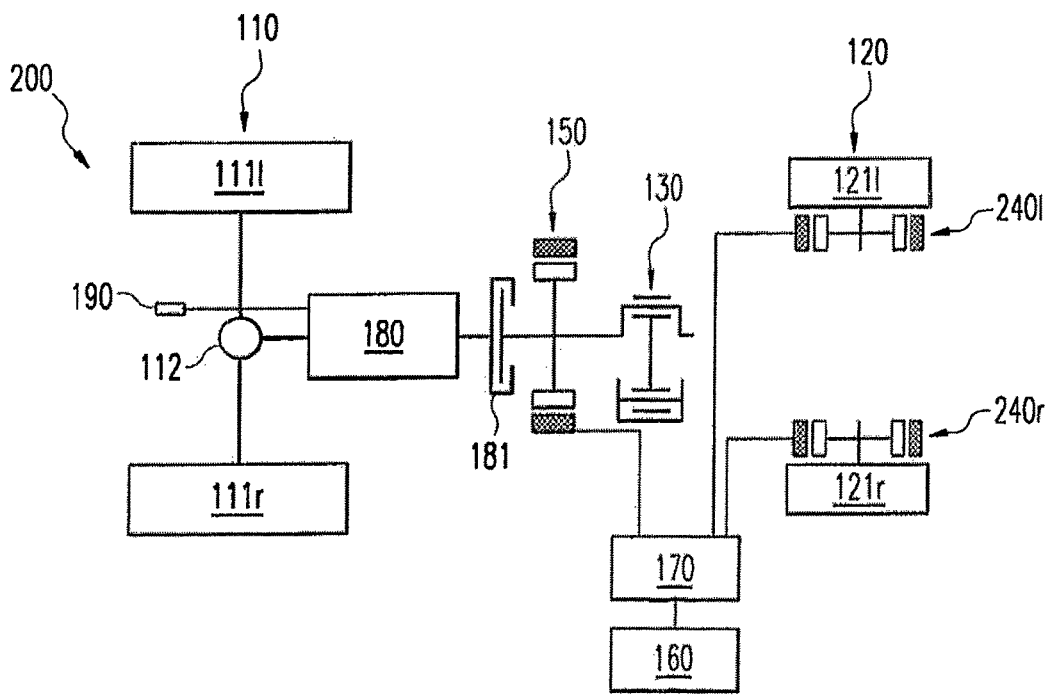
FIG. 2 shows a schematic representation of a second exemplary embodiment of a vehicle according to the invention.

FIG. 2 shows an alternative embodiment of a tractor 200 according to the invention, with the tractor 200 differing from the tractor 100 described with reference to FIG. 1 in that, in order to drive the front axle 120, not only one electric motor 140 is provided (that is, only one second drive motor), but rather two electric machines $240_l$ and $240_r$, each of which can be operated as an electric motor, with the electric motor $240_l$ being provided to drive the left front wheel $121_l$ and the electric motor $240_r$ being provided to drive the right front wheel $121_r$. The two electric motors $240_l$ and $240_r$ are each embodied as wheel hub motors and enable the wheel speeds on the left front wheel $121_l$ and on the right front wheel $121_r$ to be adjusted separately and independently of one another.

FIG. 3 shows another alternative embodiment of a vehicle according to the invention in the form of a tractor 300, with the tractor 300 differing from the tractor 100 described with reference to FIG. 1 in that it is not the combustion engine 130 that is provided to drive the rear axle 110, but rather an electric machine 340 that can be operated as an electric motor. That is, the first drive motor is formed by the electric motor 340 in this vehicle according to the invention.

Furthermore, the combustion engine 130 no longer requires any mechanical connection to the rear axle 110; in particular, no gearbox and no clutch is provided between the combustion engine 130 and the rear axle 110. In this case, the combustion engine 130 is primarily intended to drive the electric machine 150 that can be operated as a generator.

Like the drive motor 140 that is provided to drive the front axle 120, the electric motor 340 can be controlled by means of a control device (not shown here) and the power electronics 170 such that a desired target speed is also achieved on the rear axle 110, with the control device being designed to determine, as a function of the determined target speed, an appropriate control variable for controlling the electric motor 340 and to control the power electronics 170, which is also coupled with the electric motor 340, such that the desired target speed is achieved on the rear wheels $111_l$ and $111_r$ of the rear axle 110; cf. FIG. 7.

The power output from the electric motor 340 is conducted to a rear axle differential 112 and distributed to the two rear wheels $111_l$ and $111_r$. The electrical energy required to drive the rear axle 110 can also, like the electric motor 140, be drawn from the electrical energy store 160, provided that the latter is appropriately charged, and/or directly from the electric machine 150 that can be operated as a generator.

In comparison to the tractor 100 according to the invention described with reference to FIG. 1, the tractor 300 according to the invention described with reference to FIG. 3 offers the advantage that, by virtue of the electric motor 340, which is provided to drive the rear axle 110 and has a different power characteristic than a combustion engine, a very precise and particularly dynamic speed control or speed regulation of the rear wheels $111_l$ and $111_r$ of the rear axle 110 is possible, whereby the drivability can be improved even further, particularly the traction.

FIG. 4 shows another alternative embodiment of a tractor 400 according to the invention, with the tractor 400 differing from the tractor 300 described with reference to FIG. 3 in that, in order to drive the rear axle 110, not only one electric motor 140 is provided as the first drive motor, but rather two electric machines $440_l$ and $440_r$, each of which can be operated as an electric motor, with the electric motor $440_l$ being provided to drive the left rear wheel $111_l$ and the electric motor $440_r$ being provided to drive the right rear wheel $111_r$. Moreover, no rear axle differential is provided. Like the electric motors $240_l$ and $240_r$ on the front axle 120, the two electric motors $440_l$ and $440_r$ are also each embodied as wheel hub motors and enable the wheel speeds on the left rear wheel $111_l$ and on the right rear wheel $111_r$ to be set separately and independently of one another. Furthermore, like the tractor 300 described with reference to FIG. 3, this tractor 400 according to the invention has two electric machines $240_l$ and $240_r$, each of which can be operated as an electric motor, to drive the front axle 120.

FIG. 5 shows a simplified block diagram illustrating a method according to the invention for controlling the wheel speeds of the front axle 120 of the tractor 100 from FIG. 1, wherein the tractor 100 has a device for detecting driving state variables in order to determine a driving state of the vehicle with a corresponding wheel speed sensor system $10_R$ for detecting the actual speed $n_{R,act}$ of the rear axle 110 as well as a corresponding wheel speed sensor system $10_F$ for detecting the actual speed $n_{F,act}$ of the front axle 120.

As a function of the detected actual speed $n_{R,act}$ of the rear axle 110, a target speed $n_{F,Ref}$ for the wheels $121_l$, $121_r$ of the front axle 120 can be determined by means of the control device 20, and the electric motor 140 can be controlled such that the desired target speed $n_{F,Ref}$ is achieved on at least one wheel $121_l$, $121_r$ of the front axle 120.

For this purpose, the current actual speed $n_{R,act}$ of the wheels $111_l$ and $111_r$ of the rear axle 110 is detected and first multiplied by a synchronous correction factor $k_{F/R}$ that is stored in the control device 20. The product of the actual speed $n_{R,act}$ and the synchronous correction factor $k_{F/R}$ is the so-called synchronous target speed $n_{F,syn}$, which represents the target speed $n_{F,Ref}$ at which the wheel circumferential speed of the wheels $121_l$ and $121_r$ of the front axle 120 corresponds to the wheel circumferential speed of the wheels $111_l$ and $111_r$ of the rear axle 110.

The value of the synchronous correction factor $k_{F/R}$ that is stored in the control device is preferably determined by detecting a current actual speed $n_{R,act}$ of the rear axle 110 and a current actual speed $n_{F,act}$ of the front axle 120 in regular intervals during a trip on a solid driving surface, preferably at the same time, and then calculating the quotient from the detected actual speed $n_{F,act}$ of the front axle 120 and the detected actual speed $n_{R,act}$ of the rear axle 110, with the result of this quotient being the value of the synchronous correction factor $k_{F/R}$.

In this described exemplary embodiment of a method according to the invention, in order to determine the target speed $n_{F,Ref}$, not only the synchronous target speed $n_{F,syn}$, but also a differential speed ratio $n_{F,Forerun}$ is added, with the differential speed ratio $n_{F,Forerun}$ being calculated in this case by multiplying the synchronous target speed $n_{F,syn}$ by a differential correction factor $S_{F,Forerun}$, which is determined as a function of the driving state with the aid of a predefined characteristic map 11 that is stored in the control device 20. In this case, the differential correction factor $S_{F,Forerun}$ is determined as a function of the driving state variables vehicle speed v, gas pedal position a, braking pressure p, and steering angle δ. By means of the differential correction factor $S_{F,Forerun}$, which is preferably indicated in percentage points, the percentage deviation of the wheel circumferential speed of the front wheels $121_l$ and $121_r$ of the front axle 120 from the wheel circumferential speed of the wheels $111_l$ and $111_r$ of the rear axle 110 can be predefined that is, a desired forerun, synchronization, or lag can be set in a targeted manner.

In order to optimize traction, a slip-speed ratio $n_{F,slip}$ is also added to the synchronous target speed $n_{F,syn}$ and the differential speed ratio $n_{F,Forerun}$, with the slip-speed ratio $n_{F,slip}$ also being determined as a function of the driving state by means of a characteristic map that is also stored in the control device 20, particularly in a driving state control device 12 that forms a portion of the control device 20. In the described exemplary embodiment, the slip-speed ratio $n_{F,slip}$ is also determined as a function of the driving state variables vehicle speed v, gas pedal position a, braking pressure p, and steering angle δ. As will readily be understood, other driving state variables or other parameters such as a terrain condition predefined by the driver, a slope gradient, or the like can also be taken into account alternatively or in addition. In this way, a desired slip can be set, thereby optimizing the road grip and, consequently, the traction of the tractor 100.

In order to set the desired target speed $n_{F,Ref}$ on the wheels $121_l$ and $121_r$ of the front axle 120, the detected actual speed $n_{F,act}$ of the front axle 120 is compared with the desired target speed $n_{F,Ref}$ and the current control deviation $e_{n,F}$ determined. Based on the control deviation $e_{n,F}$, a suitable speed controller 13 is used to determine a required control variable $T_F$, which is a target torque in this case, for controlling the electric motor 140.

In order to prevent the electric motor 140 from reaching a critical operating state during the setting of the desired target speed $n_{F,Ref}$ on the front axle 120 and from having an excessive current consumption that damages the power electronics 170 of the electric motor 140, and in order to prevent the traction of the front axle 120 from worsening as a result of the setting of the desired target speed $n_{F,Ref}$, a power limiting device 14 is provided that limits the determined control variable $T_F$ for controlling the electric motor 140 to a maximum control variable $T_{F,Ref}$ when a control variable threshold value is exceeded. For example, the determined control variable $T_F$ for controlling the electric motor 140 is limited if the setting of the target speed $n_{F,Ref}$ requires an increase in the actual speed $n_{F,act}$, but one of the wheels $121_l$ or $121_r$ of the front axle 120 is already at the traction limit, so that an increase in the wheel circumferential speed of the respective wheel $121_l$ or $121_r$ would result in the spinning of the wheel.

The output of the control variable $T_F$ is also limited in this exemplary embodiment as a function of the driving state. For this purpose, the driving state control device 12, also as a function of the driving state variables vehicle speed v, gas pedal position a, braking pressure p, and steering angle δ, determines on the basis of a characteristic map that is stored in the control device 20 and/or in the driving state control device 12 a maximum permissible drive power $P_{F,limit}$ of the electric motor 140 for the respective driving situation and forwards it to the power limiting device 14.

In order to prevent the speed controller 13 from surging, a suitable feedback of the limited control variable $T_{F,Ref}$ is also provided in the controller 13 in order to implement an anti-windup function.

On the basis of the control variable $T_{F,Ref}$ of the electric motor 140 output by the control device 20, the desired drive power can be set on the electric motor 140 by means of the power electronics 170 with which the desired target speed $n_{F,Ref}$ is achieved on the wheels $121_l$ and $121_r$ of the front axle 120.

As described in connection with FIG. 1, the tractor 100 can be coupled with an electrically drivable implement (not shown here), particularly with an implement with electrically drivable axle, in which case the generator 150 is also designed so as to output electrical energy to an electrically drivable implement that is coupled with the tractor 100, such as a trailer with an electrically drivable axle or another electrically drivable implement.

The drive power that is transferred to the driven axle of the implement can be set in a targeted manner by means of the control device 20 if the tractor 100 is coupled with a commensurately suitable implement that is compatible with the tractor 100 and has a drivable axle, particularly if the tractor 100 is coupled with a compatible implement with an electrically drivable axle and forms a pairing, with the tractor 100 being the towing vehicle of the pairing.

The drive power transferred to the drive axle of the implement can be set such that, in particular, a desired slip is achieved on the wheels of the drive axle of the implement in relation to the driving surface as a function of a detected driving state, particularly a slip with which maximally optimal traction of the pairing and thus maximum tractive power can be achieved.

In order to adjust the drive power that is transferred to the drive axle of the implement, the driving state control device 12, also as a function of the driving state variables vehicle speed v, gas pedal position a, braking pressure p, steering angle δ, and a detected actual speed $n_{implement,act}$ of the driven axle of the implement and as a function of a terrain condition (not shown here) that is input by the driver, particularly as a function of the slope gradient, a target speed $n_{implement,Ref}$ for the driven axle of the implement is determined as a function of which the drive power of the driven axle of the implement can be appropriately set. Likewise, an appropriate maximum permissible drive power $P_{implement,limit}$ can be determined for the drive axle of the implement; that is, a power limitation is provided in this case as well.

By virtue of the fact that the terrain condition, particularly the slope gradient, can be taken into account, it is possible when starting while traveling downhill in the forward direction, for example, to adjust the drive power that is transferred to the drive axle of the implement such that a leading negative slip of the wheels of the drivable axle of the implement in relation to the driving surface is achieved relative to the slip of the wheels $111_l$ and $111_r$ of the rear axle 110 in relation to the driving surface and relative to the slip of the wheels $121_l$ and $121_r$ of the front axle 120 in relation to the driving surface—that is, a lag is produced in relation to the front axle 120 and the rear axle 110. A "stretching" of the pairing can be achieved in this way, thus improving the controllability of the pairing.

In order to achieve especially good traction with the tractor 100, the control device 20 further comprises an engine control device 131, with which the power output from the combustion engine 130 to the rear axle 110 can be adjusted in a targeted manner, with the engine control device 131 being designed to adjust the power output from the combustion engine 130 as a function of a target speed $n_{CE,Ref}$ detected by the driving state control device and a limited control variable $T_{CE,limit}$ in the form of a target torque.

Figure 6:
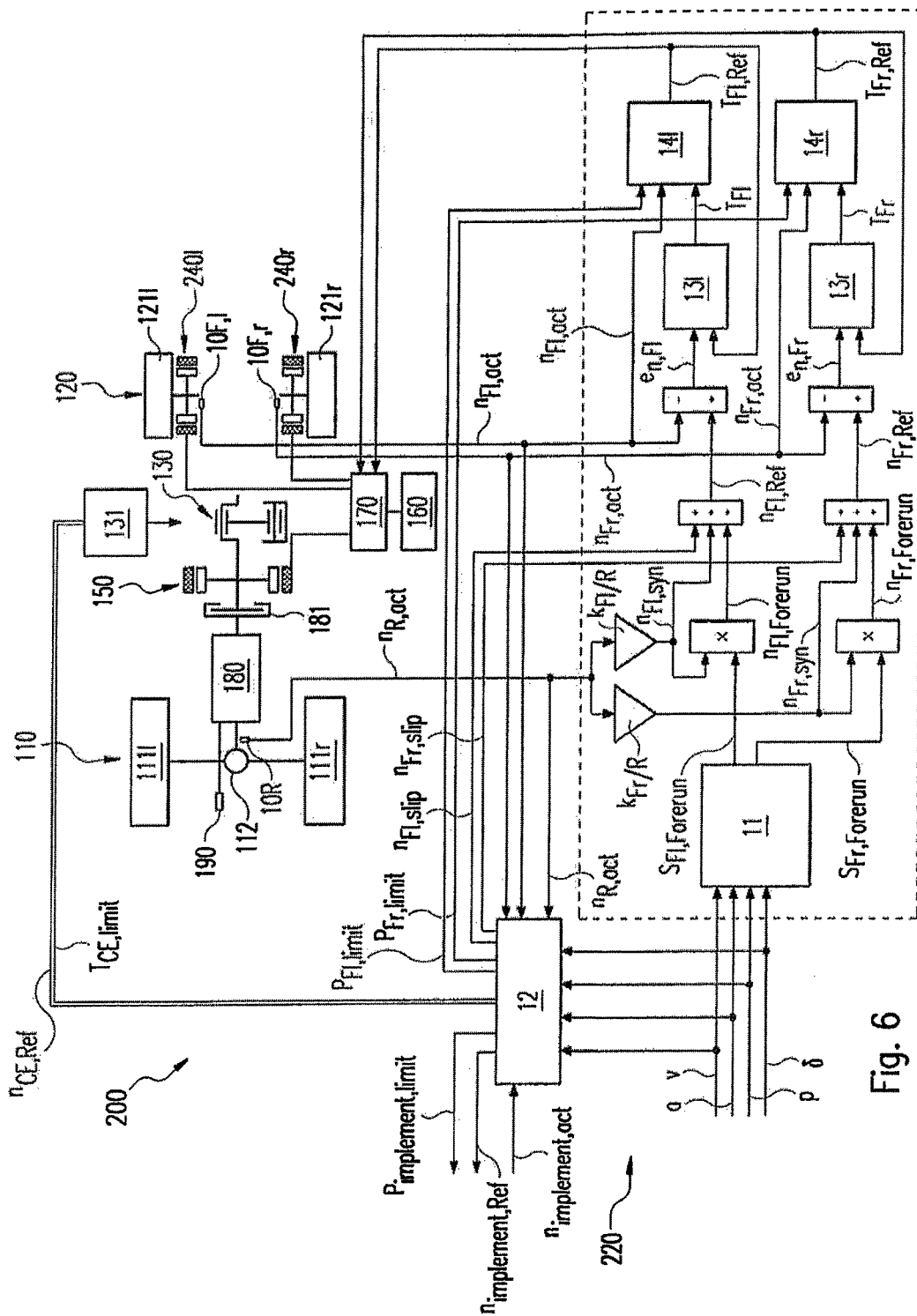
FIG. 6 shows a simplified block diagram illustrating a second exemplary embodiment of a method according to the invention for controlling the wheel speeds of the front wheels of the vehicle according to the invention from FIG. 2.

FIG. 6 shows the corresponding simplified block diagram for controlling the wheel speeds of a vehicle 200 according to the invention as described with reference to FIG. 2, in which, in order to drive the left front wheel $121_l$ and in order to drive the right front wheel $121_r$ of the front axle 100, a respective separate electric motor $240_l$ and $240_r$ is provided, with the two electric motors $240_l$ and $240_r$ each being embodied as wheel hub motors that can be controlled separately.

A respective separate target torque $T_{F,Ref}$ for controlling is determined for each electric machine $240_l$ and $240_r$ that can be operated as an electric motor. However, as in the method according to the invention that was described with reference to FIG. 5, the control variable $T_{F,Ref}$ is calculated separately for the left front wheel $121_l$ and the right front wheel $121_r$, respectively. The corresponding variables associated with the left front wheel $121_l$ are indicated accordingly with $_l$, variables associated with the right front wheel $121_r$ are indicated accordingly with $_r$, with the corresponding target speed $n_{Fl,Ref}$ and $n_{Fr,Ref}$ of the left front wheel $121_l$ and of the right front wheel $121_r$, respectively, being determined as a function of an actual speed $n_{Fl,act}$ or $n_{Fr,act}$ detected for the respective wheel.

With a tractor 200 according to the invention that is designed to execute a method according to the invention as described with reference to FIG. 6, it is possible when traveling obliquely across a slope or transversely across a slope in the direction of forward travel, for example, for the differential speed ratio $S_{Fr,Forerun}$ for determining the target speed $n_{Fr,Ref}$ of the downhill-side front wheel, for example of the right front wheel $121_r$, to be selected so as to be greater than the differential speed ratio $S_{Fl,Forerun}$ for determining the target speed $n_{Fl,Ref}$ of the left, downhill-side front wheel $121_l$, whereby the downward drifting of the tractor 200 as a result of the downgrade force can be counteracted FIG. 7 shows the corresponding simplified block diagram for controlling the wheel speeds of a vehicle 300 according to the invention as described with reference to FIG. 3, in which the first drive motor for driving the rear axle 110 is an electric machine 340 that can be operated as an electric motor, for an additional exemplary embodiment of a method according to the invention, although, unlike the methods described with reference to FIGS. 5 and 6, a target speed $n_{R,Ref}$ for the wheels $111_l$ and $111_r$ of the rear axle 110 can also be determined and set in this exemplary embodiment.

The target speed $n_{R,Ref}$ of the rear axle 110 is determined by means of the control device 320, particularly by means of the driving state control device 312, in accordance with the driving state as a function of the driving state variables vehicle speed v, gas pedal position a, braking pressure p, and steering angle δ. As will readily be understood, other driving state variables or other parameters such as a terrain condition predefined by the driver, a slope gradient, or the like can also be taken into account alternatively or in addition.

In order to set the desired target speed $n_{R,Ref}$ on the wheels $111_l$ and $111_r$ of the rear axle, a required control variable for controlling the electric motor 340, which is also a target torque in this case, is also first determined subsequently from the determined target speed $n_{R,Ref}$ for the rear axle 110 and the detected actual speed $n_{R,act}$ of the rear axle 110 by means of a suitable speed controller 313.

In order to prevent the electric motor 340 from reaching a critical operating state during the setting of the desired target speed $n_{R,Ref}$ on the rear axle 110 and from having an excessive current consumption that damages the power electronics 170 of the electric motor 340, and in order to prevent the traction of the rear axle 110 from worsening as a result of the setting of the desired target wheel speed $n_{R,Ref}$, a power limiting device 314 is likewise additionally provided that limits the determined control variable for controlling the electric motor 340 to a maximum control variable $T_{R,Ref}$ when a control variable threshold value is exceeded. For example, the determined control variable for controlling the electric motor 340 is limited if the setting of the target speed $n_{R,Ref}$ requires an increase in the actual speed $n_{R,act}$ but one of the wheels $111_l$ or $111_r$ of the rear axle 110 is already at the traction limit, so that an increase in the wheel circumferential speed of the respective wheel $111_l$ or $111_r$ would result in the spinning of the wheel.

The output of the control variable is also limited in this exemplary embodiment as a function of the driving state. For this purpose, the driving state control device 312, also as a function of the driving state variables vehicle speed v, gas pedal position a, braking pressure p, and steering angle δ, determines a maximum permissible drive power $P_{R,limit}$ of the electric motor 340 for the respective driving situation and forwards it to the power limiting device 314.

On the basis of the control variable $T_{R,Ref}$ output by the control device 320 for controlling the electric motor 340, the desired drive power can be set on the electric motor 340 by means of the power electronics 170 with which the desired target speed $n_{R,Ref}$ is achieved on the wheels $111_l$ and $111_r$ of the rear axle 110.

FIG. 8 shows the corresponding simplified block diagram for controlling the wheel speeds of a vehicle 400 according to the invention as described with reference to FIG. 4, in which, in order to drive the left rear wheel $111_l$ and in order to drive the right rear wheel $111_r$ of the rear axle 110, a separate electric motor $440_l$ or $440_r$ is provided in each case, with the two electric motors $440_l$ and $440_r$ each being embodied as wheel hub motors that can be controlled separately.

A respective separate target torque $T_{Rl,Ref}$ or $T_{Rr,Ref}$ for controlling is determined by means of the control device 420 for each electric machine $440_l$ and $440_r$ that can be operated as an electric motor. However, as in the method according to the invention that was described with reference to FIG. 7, the control variable $T_{Rl,Ref}$ or $T_{Rr,Ref}$ is calculated separately for the left rear wheel $111_l$ and the right rear wheel $111_r$, respectively.

The corresponding variables associated with the left rear wheel $111_l$ are indicated accordingly with l, variables associated with the right rear wheel $111_r$ are indicated accordingly with r, with the corresponding target speeds $n_{Rl,Ref}$ and $n_{Rr,Ref}$ of the left rear wheel $111_l$ and of the right rear wheel $111_r$, respectively, being determined as a function of an actual speed $n_{Rl,act}$ or $n_{Rr,act}$ detected for the respective wheel.

Furthermore, through the wheel-by-wheel detection of the actual speeds $n_{Rl,act}$ and $n_{Rr,act}$ of the rear wheels $111_l$ and $111_r$ of the rear axle 110, the synchronous target speeds $n_{Fl,syn}$ and $n_{Fr,syn}$ of the left front wheel $121_l$ and of the right front wheel $121_r$ can each be determined as a function of the detected actual speeds $n_{Rl,act}$ and $n_{Rr,act}$ of the left rear wheel $111_l$ and of the right rear wheel $111_r$, respectively.

The synchronous target speed $n_{Fl,syn}$ of the left front wheel $121_l$ is determined by multiplying the current actual speed $n_{Rl,act}$ of the left rear wheel $111_l$ by the synchronous correction factor $k_{Fl/Rl}$ for the left front wheel $121_l$ stored in the control device 420, while the synchronous target speed $n_{Fr,syn}$ of the right front wheel $121_r$ is determined by multiplying the current actual speed $n_{Rr,act}$ of the right rear wheel $111_r$ by the synchronous correction factor $k_{Fr/Rr}$ for the right front wheel $121_r$.

The synchronous correction factors $k_{Fr/Rr}$ and $k_{Fl/Rl}$ are each determined analogously to the method described with reference to FIG. 5, by simultaneously detecting the current actual speeds $n_{Rl,act}$ and $n_{Rr,act}$ of the of the left rear wheel $111_l$ and of the right rear wheel $111_r$ and the current actual speeds $n_{Fl,act}$ and $n_{Fr,act}$ of the left front wheel $121_l$ and of the right front wheel $121_r$ in regular intervals during a trip on a solid driving surface, and then calculating the respective quotient from the detected actual speed $n_{Fl,act}$ and $n_{Fr,act}$ of the left front wheel $121_l$ and of the right front wheel $121_r$, respectively, and of the detected actual speed $n_{Rl,act}$ and $n_{Rr,act}$ of the left rear wheel $111_l$ and of the right rear wheel $111_r$, respectively, with the result of this quotient being the value of the synchronous correction factor $k_{Fl/Rl}$ and $k_{Fr/Rr}$, respectively, that can be stored as a parameter in the control device 420.

LIST OF REFERENCE SYMBOLS

The indices of the individual variables have the following respective meaning:
l left
r right
R rear axle ("rear")
F front axle ("front")
act current quantity or actual quantity
Ref target quantity
syn pertaining to the synchronous target speed
Forerun pertaining to the differential speed ratio
slip pertaining to the slip-speed ratio
implement pertaining to an implement coupled with the tractor
limit limit value
CE pertaining to the combustion engine
The following allocations apply to the reference symbols:
10F wheel speed sensor system for detecting the actual speed of the front axle
10Fl wheel speed sensor system for detecting the actual speed of the left front axle
10Fr wheel speed sensor system for detecting the actual speed of the right front axle
10R wheel speed sensor system for detecting the actual speed of the rear axle
10Rl wheel speed sensor system for detecting the actual speed of the left rear axle
10Rr wheel speed sensor system for detecting the actual speed of the right rear axle
11 characteristic map for determining the differential correction factor
12, 312 driving state control device
13, 13l, 13r speed controller
313, 313l, 313r
14, 14l, 14r, power limiting device
314, 314l, 314r
20, 220, 320, control device
420
100, 200, 300, tractor according to the invention
400
110 rear axle
111l left rear wheel
111r right rear wheel
112 rear axle differential
120 front axle
121l left front wheel
121r right front wheel
122 front axle differential
130 combustion engine
140 electric motor
150 electric machine that can be operated as a generator and electric motor
160 energy store
170 power electronics
180 gearbox
181 clutch
190 power take-off, so-called "PTO shaft"
240l electric wheel hub motor for driving the left front wheel
240r electric wheel hub motor for driving the right front wheel
340 electric motor
440l electric wheel hub motor for driving the left rear wheel
440r electric wheel hub motor for driving the right rear wheel
a gas pedal position
δ steering angle
$e_{n,F}$ control deviation between actual and target speed of the front axle
$e_{n,Fl}$ control deviation between actual and target speed of the left front wheel
$e_{n,Fr}$ control deviation between actual and target speed of the right front wheel
$k_{F/R}$ synchronous correction factor for the front axle
$k_{Fl/R}$, $k_{Fl/R}$ synchronous correction factor for the left front wheel
$k_{Fr/R}$, $k_{Fr/Rr}$ synchronous correction factor for the right front wheel
$n_{F,act}$ actual speed of the front axle
$n_{Fl,act}$ actual speed of the left front wheel
$n_{Fr,act}$ actual speed of the right front wheel
$n_{R,act}$ actual speed of the rear axle $n_{Rl,act}$ actual speed of the left rear wheel
$n_{Rr,act}$ actual speed of the right rear wheel
$n_{F,syn}$ synchronous target speed of the front axle
$n_{Fl,syn}$ synchronous target speed of the left front wheel
$n_{Fr,syn}$ synchronous target speed of the right front wheel
$n_{F,Forerun}$ differential speed ratio of the front axle
$n_{Fl,Forerun}$ differential speed ratio of the left front wheel
$n_{Fr,Forerun}$ differential speed ratio of the right front wheel
$n_{F,slip}$ slip-speed ratio of the front axle
$n_{Fl,slip}$ slip-speed ratio of the left front wheel
$n_{Fr,slip}$ slip-speed ratio of the right front wheel
$n_{F,Ref}$ target speed of the front axle
$n_{Fl,Ref}$ target speed of the left front wheel
$n_{Fr,Ref}$ target speed of the right front wheel
$n_{implement,act}$ actual speed of the driven axle of an implement coupled with the tractor
$n_{implement,Ref}$ target speed of the driven axle of an implement coupled with the tractor
$n_{CE,Ref}$ target speed of the combustion engine required to set a desired target speed on the rear axle
$n_{R,Ref}$ target speed of the rear axle
$n_{Rl,Ref}$ target speed of the left rear wheel
$n_{Rr,Ref}$ target speed of the right rear wheel
p braking pressure
$P_{F,limit}$ maximum permissible output of the electric motor provided to drive the front axle for the current driving situation
$P_{Fl,limit}$ maximum permissible output of the wheel hub motor provided to drive the left front wheel for the current driving situation
$P_{Fr,limit}$ maximum permissible output of the wheel hub motor provided to drive the right front wheel for the current driving situation
$P_{R,limit}$ maximum permissible output of the electric motor provided to drive the rear axle for the current driving situation
$P_{Rl,limit}$ maximum permissible output of the wheel hub motor provided to drive the left rear wheel for the current driving situation
$P_{Rr,limit}$ maximum permissible output of the wheel hub motor provided to drive the right rear wheel for the current driving situation
$P_{implement,limit}$ maximum permissible output of the drive motor provided to drive the axle of an agricultural device coupled with the tractor for the current driving situation
$S_{F,Forerun}$ differential correction factor for the front axle
$S_{Fl,Forerun}$ differential correction factor for the left front wheel
$S_{Fr,Forerun}$ differential correction factor for the right front wheel
$T_F$ arithmetically determined control variable for target torque of the electric motor provided to drive the front axle
$T_{Fl}$ arithmetically determined control variable for target torque of the wheel hub motor provided to drive the left front wheel
$T_{Fr}$ arithmetically determined control variable for target torque of the wheel hub motor provided to drive the right front wheel
$T_{F,Ref}$ limited control variable for target torque of the electric motor provided to drive the front axle for the current driving situation
$T_{Fl,Ref}$ limited control variable for target torque of the wheel hub motor provided to drive the left front wheel for the current driving situation
$T_{Fr,Ref}$ limited control variable for target torque of the wheel hub motor provided to drive the right front wheel for the current driving situation
$T_{R,Ref}$ limited control variable for target torque of the electric motor provided to drive the rear axle for the current driving situation
$T_{Rl,Ref}$ limited control variable for target torque of the wheel hub motor provided to drive the left rear wheel for the current driving situation
$T_{Rr,Ref}$ limited control variable for target torque of the wheel hub motor provided to drive the right rear wheel for the current driving situation
v vehicle speed

What is claimed is:

1. A method for controlling a wheel speed of at least one wheel of a drivable axle of a two-track vehicle with two drivable axles, wherein the vehicle comprises:
a first, drivable axle with at least two wheels;
a second, drivable axle with at least two wheels;
a first drive motor;
a second drive motor;
a device for detecting driving state variables in order to determine a driving state of the vehicle; and
a control device,
wherein the first drive motor is provided to drive at least one wheel of the first axle,
wherein the second drive motor is provided to drive at least one wheel of the second axle,
wherein the device for detecting driving state variables is at least designed to detect an actual speed of the first axle, and
wherein the control device is designed to determine, at least as a function of the detected actual speed of the first axle, a target speed for the at least one wheel of the second axle and to control at least the second drive motor such that the desired target speed is achieved on the at least one wheel of the second axle,
with the steps:
detecting an actual speed of the first axle;
determining the target speed for the at least one wheel of the second axle a least as a function of the actual speed of the first axle; and
controlling the second drive motor such that the determined target speed is achieved on the at least one wheel of the second axle,
wherein, in order to determine the target speed, a synchronous target speed is determined as a function of the actual speed of the first axle, and the target speed is determined as a function of the determined synchronous target speed, with the synchronous target speed being the target speed at which the same wheel circumferential speed is achieved on the at least one wheel of the second axle as on the wheels of the first axle.

2. The method as set forth in claim 1, wherein the synchronous target speed is determined by applying a predefined synchronous correction factor to the actual speed of the first axle.

3. The method as set forth in claim 1, wherein the target speed is additionally determined as a function of a differential speed ratio, which defines the difference between the wheel circumferential speed of at least one wheel of the second axle and the wheel circumferential speed of the wheels of the first axle, with the differential speed ratio being determined by applying a predefined differential correction factor to the determined synchronous target speed.

4. The method as set forth in claim 1, wherein the device for detecting driving state variables is designed to detect not only the actual speed of the first axle, but also an additional driving state variable, wherein the additional driving state variable is detected, and a differential correction factor is determined as a function of at least one other detected driving state variable by means of a predefined characteristic map and/or through a predefined mathematical function that is dependent on the at least one other detected driving state variable.

5. The method as set forth in claim 1, wherein the target speed is additionally determined as a function of a predefined slip-speed ratio, with the slip-speed ratio being used to set a desired slip of at least one wheel of the second axle in relation to the driving surface with the slip-speed ratio being determined as a function of the actual speed of the first axle and/or as a function of at least one other driving state variable that is detected by the device for detecting a driving state variable.

6. The method as set forth in claim 1, wherein the target speed is determined as a function of a sum of the synchronous target speed, the differential speed ratio, and the slip-speed ratio.

7. The method as set forth in claim 1, wherein the vehicle is coupled with an implement and, together with the implement, forms a pairing, with the tractor forming a tractor vehicle of the pairing, wherein the implement has at least a drivable axle, and wherein the control device of the vehicle is designed to set a drive power that can be transferred to the drivable axle, wherein the drive power transferred to the drivable axle of the implement is set such that a desired slip is achieved on the wheels of the drivable axle of the implement in relation to a driving surface as a function of a detected driving state.

8. The method as set forth in claim 7, wherein in order to bring about a stretching of the pairing when starting while traveling downhill in a direction of forward travel, the drive power that is transferred to the drivable axle of the implement can be set such that a leading negative slip of the wheels of the drivable axle of the implement in relation to the driving surface is achieved relative to the slip of the wheels of the first axle in relation to the driving surface and relative to the slip of the wheels of the second axle in relation to the driving surface.

9. The method as set forth in claim 7, wherein in order to bring about a compressing of the pairing when starting while traveling uphill in a direction of forward travel, the drive power that is transferred to the drivable axle of the implement can be set such that a leading positive slip of the wheels of the drivable axle of the implement in relation to the driving surface is achieved relative to the slip of the wheels of the first axle in relation to the driving surface and relative to the slip of the wheels of the second axle in relation to the driving surface.

10. The method as set forth in claim 1, wherein the vehicle additionally has a third drive motor that is also provided for the purpose of driving at least one wheel of the second axle, with the second drive motor being provided to drive a left wheel of the second axle and the third drive motor being provided to drive a right wheel of the second axle, wherein the control device is designed to determine, at least as a function of the detected actual speed of the first axle, a target speed of the left wheel of the second axle and a target speed of the right wheel and to control at least the second and third drive motors that are provided to drive the second axle such that the desired target speed is achieved on the left wheel and on the right wheel, respectively, with the steps:

detecting an actual speed of the first axle;

determining the target speed for the left wheel of the second axle and the target speed for the right wheel of the second axle at least as a function of the actual speed of the first axle; and controlling the second drive motor and the third drive motor such that the determined target speed is achieved on the left wheel and on the right wheel of the second axle.

11. The method as set forth in claim 10, for a drive operation of the vehicle while traveling transversely across a slope, wherein the second axle forms a front axle of the vehicle, wherein the differential speed ratio for determining the target speed of a downhill-side front wheel is greater than the differential speed ratio for determining the target speed of an uphill-side front wheel in order to counteract a downward drift of the vehicle caused by a downgrade force.

12. The method as set forth in claim 11, for the autonomous drive operation of the vehicle while traveling transversely across a slope, wherein the vehicle is designed for autonomous drive operation and has a steering actuator for the autonomous adjustment of a wheel steering angle, wherein the wheel steering angle and the respective differential speed ratio of the two front wheels are set during an autonomously executed trip as a function of a detected slope gradient and/or as a function of detected steering forces such that a tractive resistance of the vehicle is reduced.

13. A two-track vehicle with at least two drivable axles wherein the vehicle comprises:

a first, drivable axle with at least two wheels;

a second, drivable axle with at least two wheels;

a first drive motor;

a second drive motor;

a device for detecting driving state variables in order to determine a driving state of the vehicle; and a control device, wherein the first drive motor is provided to drive at least one wheel of the first axle, wherein the second drive motor is provided to drive at least one wheel of the second axle, wherein the device for detecting driving state variables is at least designed to detect an actual speed of the first axle, wherein the control device is designed to determine, at least as a function of the detected actual speed of the first axle, a target speed for the at least one wheel of the second axle and to control the second drive motor such that the desired target speed is achieved on the at least one wheel of the second axle, and wherein the vehicle is designed to execute a method as set forth in claim 1.

14. The two-track vehicle as set forth in claim 13, wherein the vehicle is a hybrid vehicle, with the first drive motor, which is provided for driving the first axle, being a combustion engine, and with the second drive motor, which is provided at least for driving a wheel of the second axle, being an electric machine that can be operated as an electric motor, wherein the vehicle also includes an electric machine that can be operated as a generator and an electrical energy store, wherein the electric machine that can be operated as the generator can be powered by means of the combustion engine and is designed to output electrical energy to the electrical energy store and/or to the electric machine that can be operated as the electric motor, and wherein the electric machine that can be operated as the electric motor can be powered by means of the electrical energy made available by the generator and/or by the electrical energy store.

15. The two-track vehicle as set forth in claim 13, wherein the vehicle has a gearbox in a power branch from the first drive motor to the first axle, with an electric machine that can be operated as a generator being arranged in this power branch between the first drive motor and the gearbox.

16. The two-track vehicle as set forth in claim 13, wherein the vehicle also has a third drive motor, with the third drive motor also being provided for the purpose of driving the second axle at least partially, with the second drive motor being provided to drive a left wheel of the second axle and the third drive motor being provided to drive a right wheel of the second axle, and with the control device being designed to determine, at least as a function of the detected actual speed of the first axle, a target speed of the left wheel of the second axle and a target speed of the right wheel and to control at least the second and third drive motors that are provided to drive the second axle such that the desired target speed is achieved on the left wheel and on the right wheel, respectively, of the second axle.

\* \* \* \* \*